United States Patent
Baek et al.

(10) Patent No.: US 9,532,224 B2
(45) Date of Patent: Dec. 27, 2016

(54) METHOD OF DEVICE-TO-DEVICE DISCOVERY AND APPARATUS THEREOF

(71) Applicant: Electronics and Telecommunications Research Institute, Daejeon (KR)

(72) Inventors: Seung Kwon Baek, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 176 days.

(21) Appl. No.: 14/072,351

(22) Filed: Nov. 5, 2013

(65) Prior Publication Data

US 2014/0130137 A1    May 8, 2014

(30) Foreign Application Priority Data

Nov. 5, 2012  (KR) .................. 10-2012-0124488
Nov. 4, 2013  (KR) .................. 10-2013-0132791

(51) Int. Cl.
*H04L 29/06* (2006.01)
*H04W 12/08* (2009.01)
*H04W 76/02* (2009.01)
*H04W 8/00* (2009.01)

(52) U.S. Cl.
CPC .............. *H04W 12/08* (2013.01); *H04W 8/005* (2013.01); *H04W 76/023* (2013.01)

(58) Field of Classification Search
CPC ..... H04W 12/08; H04W 8/005; H04W 76/023
USPC ...................... 726/4, 7, 27, 29; 713/171, 168
See application file for complete search history.

(56) References Cited

U.S. PATENT DOCUMENTS

| | | | | |
|---|---|---|---|---|
| 6,629,145 B1* | 9/2003 | Pham | ................... | H04L 29/06 707/999.002 |
| 7,447,757 B2* | 11/2008 | Muto | ................... | G06F 1/3203 709/203 |
| 8,316,438 B1* | 11/2012 | Bush | ................... | H04L 12/66 726/22 |
| 8,351,442 B1* | 1/2013 | McGlaughlin | ........ | G06F 13/128 370/229 |
| 8,493,887 B2 | 7/2013 | Palanki et al. | | |
| 8,495,187 B2* | 7/2013 | Kim | ................... | H04L 12/2805 709/206 |
| 8,594,632 B1* | 11/2013 | Azizi | ................... | H04W 12/06 455/411 |

(Continued)

FOREIGN PATENT DOCUMENTS

KR    10-2012-0047350    5/2012

*Primary Examiner* — David García Cervetti
(74) *Attorney, Agent, or Firm* — Nelson Mullins Riley & Scarborough LLP

(57) ABSTRACT

Disclosed are a method of device-to-device discovery and an apparatus for the same. A method of device-to-device discovery performed in a discovery terminal may include receiving a discovery identifier of the discovery terminal from a device-to-device server; performing an authorization procedure on performing the restricted discovery of an application located in the discovery terminal with the device-to-device server; and obtaining terminal information of a discoverable terminal as a counterpart terminal with which performs the restricted discovery from the device-to-device server, when the authorization is completed. Thus, the device-to-device discovery may be performed efficiently.

20 Claims, 27 Drawing Sheets

(56) References Cited

U.S. PATENT DOCUMENTS

| | | | |
|---|---|---|---|
| 8,621,211 B1* | 12/2013 | Kishore | H04L 41/0806 713/168 |
| 9,049,042 B2* | 6/2015 | Tagg | H04L 12/2856 |
| 2002/0161596 A1* | 10/2002 | Johnson | G06Q 10/10 705/1.1 |
| 2002/0184357 A1* | 12/2002 | Traversat | G06F 9/4416 709/223 |
| 2003/0065851 A1* | 4/2003 | Layman | H04W 28/06 710/260 |
| 2004/0003039 A1* | 1/2004 | Humphrey | A63F 13/12 709/204 |
| 2004/0071148 A1* | 4/2004 | Ozaki | H04L 12/2805 370/401 |
| 2004/0095897 A1* | 5/2004 | Vafaei | H04L 29/06 370/254 |
| 2004/0192349 A1* | 9/2004 | Reilly | G01C 21/20 455/456.2 |
| 2004/0205211 A1* | 10/2004 | Takeda | H04L 29/12933 709/230 |
| 2004/0263898 A1* | 12/2004 | Ferlitsch | G06F 3/1207 358/1.15 |
| 2004/0267876 A1* | 12/2004 | Kakivaya | H04L 67/16 709/200 |
| 2005/0027871 A1* | 2/2005 | Bradley | G06Q 20/1235 709/227 |
| 2006/0126611 A1* | 6/2006 | Kelly | H04L 29/12283 370/389 |
| 2006/0140165 A1* | 6/2006 | Koodli | H04L 29/12311 370/338 |
| 2006/0159032 A1* | 7/2006 | Ukrainetz | H04L 29/12216 370/254 |
| 2006/0250982 A1* | 11/2006 | Yuan | H04L 29/12113 370/254 |
| 2008/0133759 A1* | 6/2008 | Weel | H04N 21/4126 709/227 |
| 2008/0205388 A1* | 8/2008 | Colville | H04L 45/26 370/389 |
| 2008/0229089 A1* | 9/2008 | Assouad | H04L 41/085 713/2 |
| 2008/0256251 A1* | 10/2008 | Huotari | H04L 67/16 709/229 |
| 2009/0063691 A1* | 3/2009 | Kalofonos | H04L 63/102 709/229 |
| 2009/0164630 A1* | 6/2009 | Hirata | H04L 63/0209 709/225 |
| 2009/0222517 A1* | 9/2009 | Kalofonos | G06Q 10/10 709/204 |
| 2011/0082939 A1* | 4/2011 | Montemurro | H04W 76/023 709/227 |
| 2011/0082940 A1* | 4/2011 | Montemurro | H04L 69/24 709/227 |
| 2011/0149798 A1* | 6/2011 | Cordeiro | H04W 8/005 370/254 |
| 2011/0271334 A1* | 11/2011 | Yang | H04L 63/083 726/7 |
| 2011/0317569 A1* | 12/2011 | Kneckt | H04W 74/0833 370/252 |
| 2012/0033585 A1 | 2/2012 | Michaelis et al. | |
| 2012/0120953 A1 | 5/2012 | Lee et al. | |
| 2012/0163235 A1* | 6/2012 | Ho | H04W 76/023 370/254 |
| 2012/0179789 A1* | 7/2012 | Griot | H04W 12/08 709/220 |
| 2012/0265818 A1* | 10/2012 | Van Phan | H04W 8/005 709/204 |
| 2013/0059583 A1* | 3/2013 | Van Phan | H04W 72/04 455/435.1 |
| 2013/0064138 A1* | 3/2013 | Hakola | H04L 67/16 370/255 |
| 2013/0083684 A1* | 4/2013 | Yeh | H04W 8/26 370/252 |
| 2013/0109301 A1* | 5/2013 | Hakola | H04W 76/023 455/39 |
| 2013/0114526 A1* | 5/2013 | Ahn | H04W 8/005 370/329 |
| 2013/0122893 A1* | 5/2013 | Turtinen | H04W 8/005 455/423 |
| 2013/0148566 A1* | 6/2013 | Doppler | H04W 72/005 370/312 |
| 2013/0150051 A1* | 6/2013 | Van Phan | H04W 12/04 455/437 |
| 2013/0155962 A1* | 6/2013 | Hakola | H04W 72/042 370/329 |
| 2013/0159522 A1* | 6/2013 | Hakola | H04L 63/0823 709/225 |
| 2013/0160101 A1* | 6/2013 | Hakola | H04W 76/023 726/7 |
| 2013/0184024 A1* | 7/2013 | Chen | H04W 76/023 455/509 |
| 2013/0195026 A1* | 8/2013 | Johnsson | H04W 72/0493 370/329 |
| 2013/0227152 A1* | 8/2013 | Lee | H04W 48/16 709/227 |
| 2013/0273923 A1* | 10/2013 | Li | H04W 28/02 455/450 |
| 2013/0288668 A1* | 10/2013 | Pragada | H04W 12/06 455/426.1 |
| 2013/0297810 A1* | 11/2013 | Ho | H04W 76/028 709/228 |
| 2013/0316727 A1* | 11/2013 | Edge | H04W 4/02 455/456.1 |
| 2013/0322276 A1* | 12/2013 | Pelletier | H04W 72/085 370/252 |
| 2013/0324114 A1* | 12/2013 | Raghothaman | H04W 76/023 455/426.1 |
| 2014/0003373 A1* | 1/2014 | Hakola | H04W 48/16 370/329 |
| 2014/0004796 A1* | 1/2014 | Cakulev | H04W 76/023 455/41.2 |
| 2014/0010172 A1* | 1/2014 | Wei | H04W 76/023 370/329 |
| 2014/0036793 A1* | 2/2014 | Johnsson | H04W 24/04 370/329 |
| 2014/0056220 A1* | 2/2014 | Poitau | H04W 40/246 370/328 |
| 2014/0057667 A1* | 2/2014 | Blankenship | H04L 67/303 455/500 |
| 2014/0064263 A1* | 3/2014 | Cheng | H04W 8/005 370/350 |
| 2014/0078952 A1* | 3/2014 | Bontu | H04W 76/023 370/312 |
| 2014/0092885 A1* | 4/2014 | Venkatachalam | H04W 76/023 370/338 |
| 2014/0094162 A1* | 4/2014 | Heo | H04W 52/0258 455/422.1 |
| 2014/0094212 A1* | 4/2014 | Ahn | H04W 48/16 455/517 |
| 2014/0094213 A1* | 4/2014 | Khoshnevis | H04W 52/383 455/522 |
| 2014/0112258 A1* | 4/2014 | Vanderveen | H04W 76/023 370/329 |
| 2014/0112270 A1* | 4/2014 | Kuo | H04W 76/023 370/329 |
| 2014/0119544 A1* | 5/2014 | Lee | H04W 4/02 380/270 |
| 2014/0185495 A1* | 7/2014 | Kuchibhotla | H04W 76/023 370/281 |
| 2014/0185530 A1* | 7/2014 | Kuchibhotla | H04W 76/023 370/329 |
| 2014/0199969 A1* | 7/2014 | Johnsson | H04W 56/00 455/411 |
| 2014/0219261 A1* | 8/2014 | Johnsson | H04W 76/023 370/338 |
| 2014/0335906 A1* | 11/2014 | Kim | H04W 40/246 455/509 |
| 2014/0349579 A1* | 11/2014 | Zhou | H04W 12/06 455/41.2 |

(56) References Cited

U.S. PATENT DOCUMENTS

| | | | |
|---|---|---|---|
| 2015/0087233 A1* | 3/2015 | Kim | H04W 4/008 |
| | | | 455/41.2 |
| 2015/0120934 A1* | 4/2015 | Wei | H04L 47/70 |
| | | | 709/226 |
| 2015/0142986 A1* | 5/2015 | Reznik | H04L 67/16 |
| | | | 709/228 |
| 2015/0195828 A1* | 7/2015 | Fujishiro | H04W 8/005 |
| | | | 370/329 |
| 2015/0195863 A1* | 7/2015 | Reznik | H04W 76/027 |
| | | | 370/228 |
| 2015/0208225 A1* | 7/2015 | Yu | H04W 4/008 |
| | | | 370/329 |
| 2015/0208262 A1* | 7/2015 | Siomina | H04W 64/00 |
| | | | 370/252 |
| 2015/0245192 A1* | 8/2015 | Wu | H04W 8/005 |
| | | | 370/329 |
| 2015/0282143 A1* | 10/2015 | Kim | H04W 8/005 |
| | | | 370/329 |

* cited by examiner

DMF: DISCOVERY MANAGEMENT FUNCTION

FIG. 10

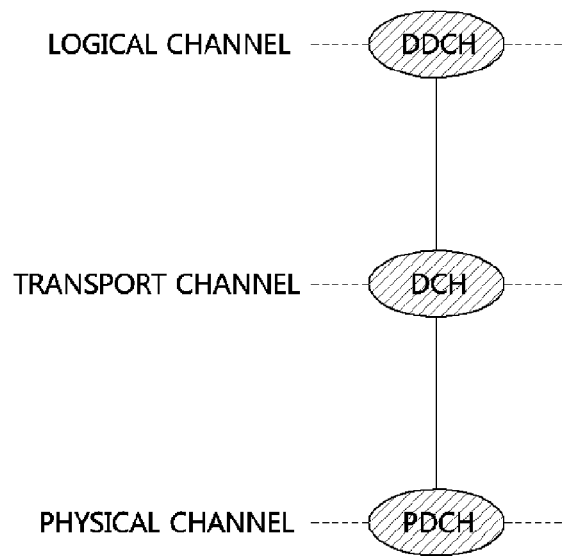

FIG. 11

| STATE | DESCRIPTIONS | REMARKS |
|---|---|---|
| IDLE | IDLE STATE MEANS A STATE THAT PROCEDURES RELATED TO D2D DISCOVERY ARE NOT PERFORMED BY TERMINAL | |
| DISCOVERY | DISCOVERY STATE MEANS A STATE THAT TERMINAL IS RECEIVING DISCOVERY MESSAGE | |
| DISCOVERABLE | DISCOVERABLE STATE MEANS A STATE THAT TERMINAL IS TRANSMITTING DISCOVERY MESSAGE | |
| DISCOVERY & DISCOVERABLE | DISCOVERY & DISCOVERABLE STATE MEANS A STATE THAT TERMINAL IS TRANSMITTING AND RECEIVING DISCOVERY MESSAGE | |

FIG. 31

| MESSAGE NAME | DESCRIPTIONS | PARAMETERS (CONDITIONAL) |
|---|---|---|
| APP_DISCOVERY_FEATURE_REQ | USAGE AUTHENTICATION REQUEST MESSAGE FOR DISCOVERY SERVICE OF APPLICATION | APPLICATION ID, TERMINAL ID |
| APP_DISCOVERY_FEATURE_RSP | USAGE AUTHENTICATION RESPONSE MESSAGE FOR DISCOVERY SERVICE OF APPLICATION | RESULT, CAUSE |
| DISCOVERABLE_ID_REQ | ADD REQUEST MESSAGE OF DISCOVERABLE TERMINALS LIST | TARGET TERMINAL ID, APPLICATION ID |
| DISCOVERABLE_ID_RSP | ADD RESPONSE MESSAGE OF DISCOVERABLE TERMINALS LIST | RESULT, CAUSE, DISCOVERY ID OF TARGET TERMINAL |
| INVITE_REQ | INVITATION REQUEST MESSAGE FOR ADDING DISCOVERABLE LIST OF TERMINAL | TARGET TERMINAL ID, APPLICATION ID, OPERATION FLAG |
| INVITE_RSP | INVITATION RESPONSE MESSAGE FOR ADDING DISCOVERABLE LIST OF TERMINAL | RESULT, CAUSE |
| INVITE_COMPLETE | INVITATION COMPLETE MESSAGE FOR ADDING DISCOVERABLE LIST OF TERMINAL | DISCOVERY ID OF SOURCE TERMINAL |
| ACTIVATE_DISCOVERY_REQ | ACTIVATE REQUEST MESSAGE OF D2D DISCOVERY | DISCOVERY TYPE, DISCOVERY STATE, TARGET TERMINAL ID, PERMISSION FLAG, RECEIVING MODE, RANGE CLASS |
| ACTIVATE_DISCOVERY_RSP | ACTIVATE RESPONSE MESSAGE OF D2D DISCOVERY | RESULT, CAUSE, TARGET DISCOVERY ID |
| DISCOVERY_SETUP_REQ | RADIO RESOURCE CONFIGURATION REQUEST MESSAGE FOR D2D DISCOVERY | TERMINAL ID, DISCOVERY STATE, RECEIVING MODE, RESOURCE CONFIGURATION INFORMATION |
| DISCOVERY_SETUP_RSP | RADIO RESOURCE CONFIGURATION RESPONSE MESSAGE FOR D2D DISCOVERY | RESULT, CAUSE, RESOURCE CONFIGURATION INFORMATION |
| DEACTIVATE_DISCOVERY_REQ | DEACTIVATE REQUEST MESSAGE OF D2D DISCOVERY | |
| DEACTIVATE_DISCOVERY_RSP | DEACTIVATE RESPONSE MESSAGE OF D2D DISCOVERY | RESULT, CAUSE |
| DISCOVERY_RELEASE_REQ | RADIO RESOURCE RELEASE REQUEST MESSAGE FOR D2D DISCOVERY | TERMINAL ID, DISCOVERY STATE |
| DISCOVERY_RELEASE_RSP | RADIO RESOURCE RELEASE RESPONSE MESSAGE FOR D2D DISCOVERY | RESULT, CAUSE |

FIG. 32

| MESSAGE NAME | DESCRIPTIONS | PARAMETERS (CONDITIONAL) |
|---|---|---|
| REQUEST_DISCOVERY_ACTIVATION | REQUEST MESSAGE OF D2D DISCOVERY ACTIVATE REQUEST STARTED IN NETWORK | CAUSE, DISCOVERY TYPE, DISCOVERY STATE, RANGE CLASS (FOR DISCOVERABLE TERMINAL), RECEIVING MODE (FOR DISCOVERY TERMINAL) |
| REQUEST_DISCOVERY_ACTIVATION_REJ | REJECTION MESSAGE OF D2D DISCOVERY ACTIVATE REQUEST STARTED IN NETWORK | CAUSE |
| REQUEST_DISCOVERY_DEACTIVATION | D2D DISCOVERY DEACTIVATE REQUEST MESSAGE STARTED IN NETWORK | CAUSE |
| REQUEST_DISCOVERY_DEACTIVATION_REJ | REJECTION MESSAGE OF D2D DISCOVERY DEACTIVATE REQUEST STARTED IN NETWORK | CAUSE |
| DISCOVERY_ID_REQ | DISCOVERY ID REQUEST MESSAGE FOR SPECIFIC TERMINAL | TERMINAL ID |
| DISCOVERY_ID_RSP | DISCOVERY ID RESPONSE MESSAGE FOR SPECIFIC TERMINAL | RESULT, CAUSE, DISCOVERY ID |
| UE_IDENTITY_REQ | TERMINAL ID REQUEST MESSAGE OF TERMINAL CORRESPONDING TO DISCOVERY ID | DISCOVERY ID |
| UE_IDENTITY_RSP | TERMINAL ID RESPONSE MESSAGE OF TERMINAL CORRESPONDING TO DISCOVERY ID | TERMINAL ID, ADDRESS FOR 2ND FILTERING |
| DISCOVERY_EVENT_REPORT | D2D DISCOVERY RELATED EVENT AND INFORMATION REPORT MESSAGE | EVENT TYPE, DISCOVERED TERMINAL ID |
| RESOURCE_CONFIG_INFO_REQ | REQUEST MESSAGE ON RADIO RESOURCE CONFIGURATION INFORMATION FOR SHARED DISCOVERY OF CELL MANAGED BY eNB | CELL ID |
| RESOURCE_CONFIG_INFO_RSP | RESPONSE MESSAGE ON RADIO RESOURCE CONFIGURATION INFORMATION FOR SHARED DISCOVERY OF CELL MANAGED BY eNB | SHARED DISCOVERY RESOURCE CONFIGURATION OF CELL |
| DISCOVERY_INFO_XFER | MESSAGE FOR INFORMATION TRANSMISSION BETWEEN D2D SERVERS | PROTOCOL MESSAGES |

FIG. 33

| PARAMETER NAME | DESCRIPTIONS | REMARKS |
|---|---|---|
| UE ID. | TERMINAL ID | |
| RESULT | RESULT CODE | OK, NOT OK |
| CAUSE | CAUSE CODE | |
| APPLICATION ID | APPLICATION ID | |
| DISCOVERY TYPE | DISCOVERY TYPE | RESTRICTED, OPEN |
| DISCOVERY STATE | OPERATION STATE OF DISCOVERY | DISCOVERY DISCOVERABLE |
| PERMISSION FLAG | WHETHER TO POSSESS (ALLOW) COUNTERPART DISCOVERY ID | YES, NO |
| RANGE CLASS | AVAILABLE TRANSMISSION COVERAGE | SHORT, MEDIUM, LONG |
| RX MODE | RADIO RESOURCE RECEPTION MODE FOR DISCOVERY TERMINAL | CELL-SPECIFIC DISCOVERY RESOURCE, TERMINAL-SPECIFIC DISCOVERY RESOURCE |
| DISCOVERY ID. | DISCOVERY ID | |
| RESOURCE CONF. INFO. | RADIO RESOURCE CONFIGURATION INFORMATION FOR DISCOVERY | |
| ADDRESS OF 2ND FILTERING | INFORMATION FOR 2ND FILTERING | |
| EVENT TYPE | GENERATION EVENT TYPE RELATED TO DISCOVERY | DISCOVERED, DISCOVER |
| CELL ID. | CELL ID | |
| OPERATION FLAG | DISCOVERY INFORMATION SHARE AND FLAG FOR DISCOVERY APPROVAL/CANCELLING APPROVAL PROCEDURE | SET, CLEAR |

METHOD OF DEVICE-TO-DEVICE DISCOVERY AND APPARATUS THEREOF

CLAIM FOR PRIORITY

This application claims priority to Korean Patent Application No. 10-2012-0124488 filed on Nov. 5, 2012 and No. 10-2013-0132791 filed on Nov. 4, 2013 in the Korean Intellectual Property Office (KIPO), the entire contents of which are hereby incorporated by reference.

BACKGROUND

1. Technical Field

The present invention relates to a technology of a device-to-device discovery, and more particularly, to a method of communication in order to perform the device-to-device discovery between adjacent devices efficiently and an apparatus for the same.

2. Related Art

In a cellular communication environment, a general method for terminals to exchange data each other is a communication via a base station. That is, if a first terminal has data to be transmitted to a second terminal, the first terminal transmits the data to a first base station to which the first terminal is attached at first. Then, the first base station transmits the data received from the first terminal to a second base station to which the second terminal is attached via a core network (CN). At last, the second base station transmits the data received from the first base station to the second terminal. Here, the first base station and the second base station may be the same base station or different base stations.

On the other hand, a device-to-device (D2D) communication may represent a direct communication between terminals without a base station. That is, the first terminal can transmit the data to the second terminal directly without using the base station(s) for the above-mentioned instance.

Also, a device-to-device discovery may represent discovering adjacent terminal using a device-to-device link between adjacent terminals as similar to the D2D communication.

SUMMARY

Accordingly, example embodiments of the present invention are provided to substantially obviate one or more problems due to limitations and disadvantages of the related art.

Example embodiments of the present invention provide a method of a restricted discovery in order to perform a discovery between adjacent terminals efficiently.

Example embodiments of the present invention also provide a method of activating a restricted discovery in order to perform a discovery between adjacent terminals efficiently.

Example embodiments of the present invention also provide a method of deactivating a restricted discovery in order to perform a discovery between adjacent terminals efficiently.

In some example embodiments, a method of restricted discovery performed in a discovery terminal may comprise receiving a discovery identifier of the discovery terminal from a device-to-device server; performing an authorization procedure on performing the restricted discovery of an application located in the discovery terminal with the device-to-device server; and obtaining terminal information of a discoverable terminal as a counterpart terminal with which performs the restricted discovery from the device-to-device server, when the authorization is completed.

Here, the discovery identifier may indicate that the discovery terminal supports the restricted discovery.

Here, the performing an authorization procedure may include transmitting an authorization request message requesting an authorization on performing the restricted discovery of the application located in the discovery terminal to the device-to-device server; and receiving an authorization response message in response to the authorization request message from the device-to-device server.

Also, the authorization request message may include an identifier of the discovery terminal and an identifier of the application.

Here, the obtaining terminal information may include transmitting a discoverable terminal information request message to the device-to-device server; receiving the discoverable terminal information response message in response to the discoverable terminal information request message from the device-to-device server; and updating a list of discoverable terminals based on the terminal information included in the received discoverable terminal information response message.

Also, the discoverable terminal information request message may include an identifier of a target terminal, an operation flag, and the application identifier.

Also, the operation flag may indicate a request for approving of the restricted discovery or a request for cancelling approval of the restricted discovery.

Also, the discoverable terminal information response message may include an identifier of the discoverable terminal, and a response information on whether to approve the restricted discovery.

Also, the identifier of the discoverable terminal may be added in the list of discoverable terminals, when the response information indicates that the restricted discovery is approved of.

In other example embodiments, a method of activating a restricted discovery performed in a discovery terminal may comprise transmitting a restricted discovery activation request message to a device-to-device server to activate the restricted discovery of the discoverable terminal; receiving information on radio resources used for the restricted discovery through a base station interworking with the device-to-device server, when the restricted discovery of the discoverable terminal is activated; receiving a restricted discovery activation response message in response to the restricted discovery activation request message from the device-to-device server; and performing the restricted discovery with the discoverable terminal through radio resources indicated by the information on radio resources.

Here, the restricted discovery activation request message may include a discovery type, a discovery state, an identifier of application in the discovery terminal, and an identifier of the discoverable terminal.

Here, the restricted discovery activation response message may include a discovery identifier of the discovery terminal and a discovery identifier of the discoverable terminal.

Here, the discovery terminal may be transitioned to a restricted discovery activated state, when the restricted discovery activation response message is received.

Here, the device-to-device server may allocate radio resources used for the restricted discovery to the discoverable terminal, when the restricted discovery activation response message is received.

Also, the device-to-device server may configure a discovery identifier of the discovery terminal and a discovery identifier of the discoverable terminal, when the allocation of radio resources is completed.

Here, a message between the discovery terminal and the device-to-device server is exchanged through a mobile management entity (MME).

In still other example embodiments, a method of deactivating a restricted discovery service performed in a discovery terminal may comprise transmitting a restricted discovery deactivation request message to a device-to-device server to deactivate the restricted discovery of a discoverable terminal; receiving information of releasing radio resources allocated for the restricted discovery from a base station interworking the device-to-device server, when the restricted discovery of the discoverable terminal is deactivated; receiving a restricted discovery deactivation response message in response to the restricted discovery deactivation request message from the device-to-device server; and transitioning to an idle state.

Here, the device-to-device server may release the radio resources allocated to the discoverable terminal for the restricted discovery, when the restricted deactivation request message is received.

Also, the device-to-device server may release a discovery identifier configured for the discoverable terminal, when the release of radio resources allocated to the discoverable terminal is completed.

Here, the device-to-device server may release a discovery identifier configured for the discovery terminal, when the release of radio resources allocated to the discovery terminal is completed.

BRIEF DESCRIPTION OF DRAWINGS

Example embodiments of the present invention will become more apparent by describing in detail example embodiments of the present invention with reference to the accompanying drawings, in which:

FIG. 10 is a conceptual diagram to show a channel mapping for D2D discovery message transmission/reception procedure;

FIG. 11 is a conceptual diagram to show transmission and reception states of D2D discovery;

FIG. 31 is a conceptual diagram to depict definitions of protocol messages for D2D discovery;

FIG. 32 is a conceptual diagram to depict definitions of other protocol messages for D2D discovery; and FIG. 33 is a conceptual diagram to depict parameter definitions of protocol messages for D2D discovery.

DESCRIPTION OF EXAMPLE EMBODIMENTS

Figure 1:
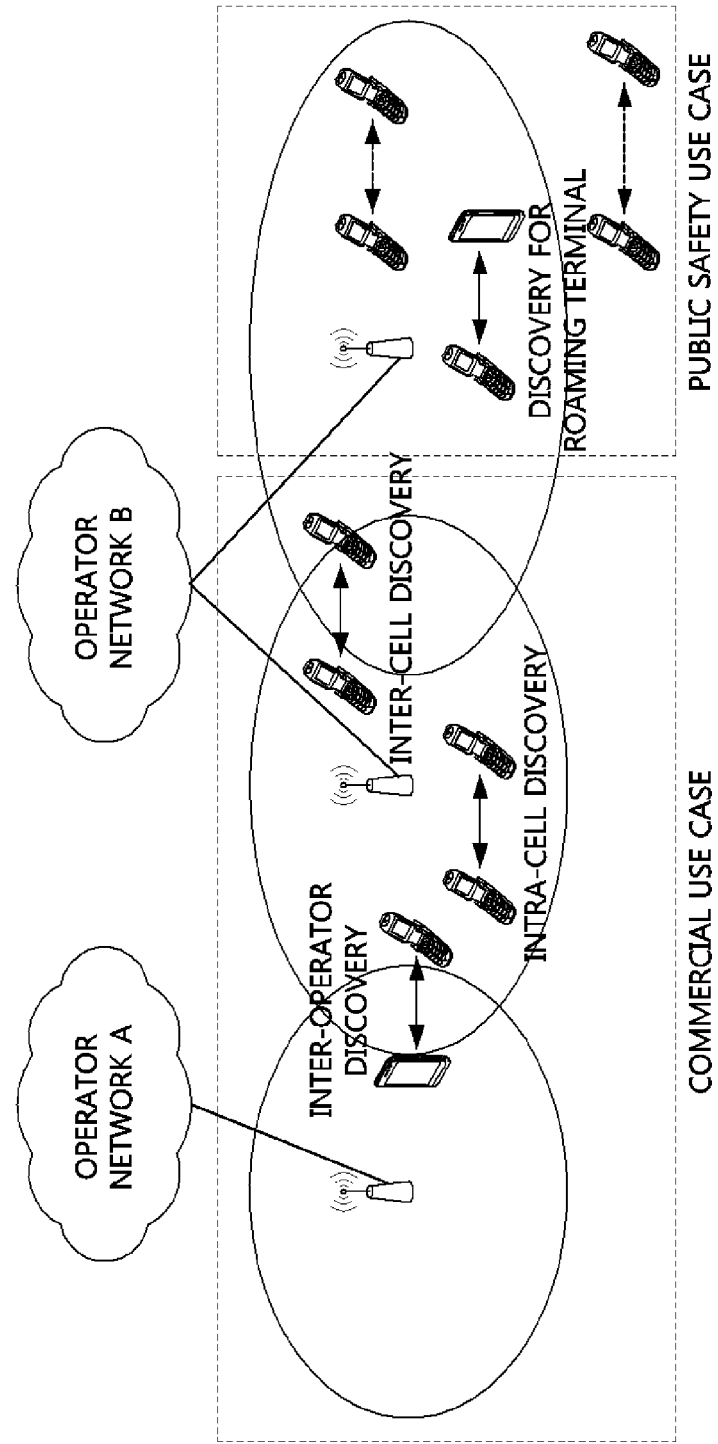
FIG. 1 is a conceptual diagram to depict operation scenarios related to D2D discovery.

Example embodiments of the present invention are disclosed herein. Specific structural and functional details disclosed herein are merely representative for purposes of describing example embodiments of the present invention.

However, example embodiments of the present invention may be embodied in many alternate forms and should not be construed as limited to example embodiments of the present invention set forth herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "network" or "communication network" used in this specification may include a mobile internet such as a Wireless Fidelity (WIFI), a Wireless Broadband Internet (WiBro), and a World Interoperability for Microwave Access (WiMax). Also, it may include 2G cellular network such as a Global System for Mobile communication (GSM) and a Code Division Multiple Access (CDMA), 3G cellular network such as a Wideband Code Division Multiple Access (WCDMA) and a CDMA2000. Also, it may include 3.5G cellular network such as a High Speed Downlink Packet Access (HSDPA) and a High Speed Uplink Packet Access (HSUPA). Also, it may include 4G or beyond 4G cellular network such as a Long Term Evolution (LTE) and a LTE-Advanced.

The term "terminal" or "device" used herein may refer to a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various embodiments of a device may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but the present invention is not limited thereto.

The term "base station" used herein generally denotes a fixed or mobile point communicating with a device, and may be referred to as a base station, Node-B, evolved Node-B (eNode-B), a base transceiver system (BTS), an access point, a relay, a femtocell, and other terms.

Hereinafter, example embodiments of the present invention will be described in detail with reference to the accompanying drawings. In describing the present invention, the same elements in the drawings will be designated by the same reference numerals in order to facilitate entire understanding and a duplicate description of the same elements will be omitted.

A device-to-device (D2D) discovery is a procedure for a specific user equipment (UE) to discover neighbor user equipments or services based on signal received by using radio resources. For this, the user equipments or services desiring to be discovered by neighbor user equipments or services may transmit a predetermined discovery message by using radio resources configured for D2D discovery, and the user equipments or services desiring to discover neighbor user equipments or services may receive the discovery message transmitted using the radio resources configured for D2D discovery.

A range of D2D discovery may be generally classified into a service-level discovery and a device-level discovery. The service-level discovery may mean discovery on services provided by neighbor user equipments, and the device-level discovery may mean discovery on identifiers (IDs) of neighbor user equipments. The D2D discovery which will be considered in the present invention covers two types of discoveries such as the service-level discovery and the device-level discovery.

In the specification, a terminal desiring to be discovered by neighbor terminals may be defined as 'a discoverable terminal' and a terminal desiring to discover neighbor terminals may be defined as 'a discovery terminal'.

A function of the D2D discovery may be classified into a commercial use case and a public safety use case, and requirements related to the D2D discovery are shown as follows.

D2D discovery related requirements for the commercial use case

Restricted Discovery:

Discovery performed only with approval of the discoverable UE. For example, it is used for a Social Networking Service (SNS), a Evolved Packet System (EPS), and a Proximity Service (ProSe).

Open Discovery

Discovery performed without approval of the discoverable UE. For example, it is used for an advertisement service and a mobile game.

Discovery Capability

A function enabling to discover adjacent other devices and a function enabling to be discovered by adjacent other terminals.

Discovery across public land mobile networks (PLMNs)

A function of discovery between terminals which subscribe to different PLMNs

Discovery of roaming subscribers

A function of discovery on terminals roamed from other network.

D2D discovery related requirements for the public safety use case

Discovery in network coverage

A function of discovery on terminals located in an operator network coverage.

Discovery out of network coverage

A function of discovery on terminals located in out of an operator network coverage.

Also, requirements for authorization and charging of the D2D discovery are as follows.

Authorization
Authorization of discovery operations for respective terminals
Authorization of terminals which are discovered by other terminals
Authorization of terminals which discover other terminals
Charging
Ability for terminals which are discovered
Ability for discovering other terminals
Event for discovering terminals On the other hand, main requirements suggested in the device-to-device communication are as follow.

Administration of D2D discovery process
Administration by network operator
Administration by a specific terminal in scenario out of network coverage
Aspects of spectrum
Operation of LTE Frequency Division Duplex (FDD) and LTE Time Division Duplex (TDD)
Dedicated spectrum shared by a plurality of operators
Operations on shared spectrum FIG. 1 is a conceptual diagram to depict operation scenarios related to D2D discovery.

Referring to FIG. 1, D2D discovery operation scenarios may be classified into an inter-operator discovery scenario, an intra-cell discovery scenario, an inter-cell discovery scenario, and a discovery scenario for roaming terminals, etc.

A spectrum usage model for the D2D discovery and communication may be classified into shared-type model and dedicated-type model. In the shared-type, the D2D discovery and communication are performed in the spectrum which is the same with cellular spectrum. On the contrary, in the dedicated-type model, the D2D discovery and the communication are performed in spectrum dedicated for the D2D discovery shared by a plurality of mobile network operators.

Figure 2:
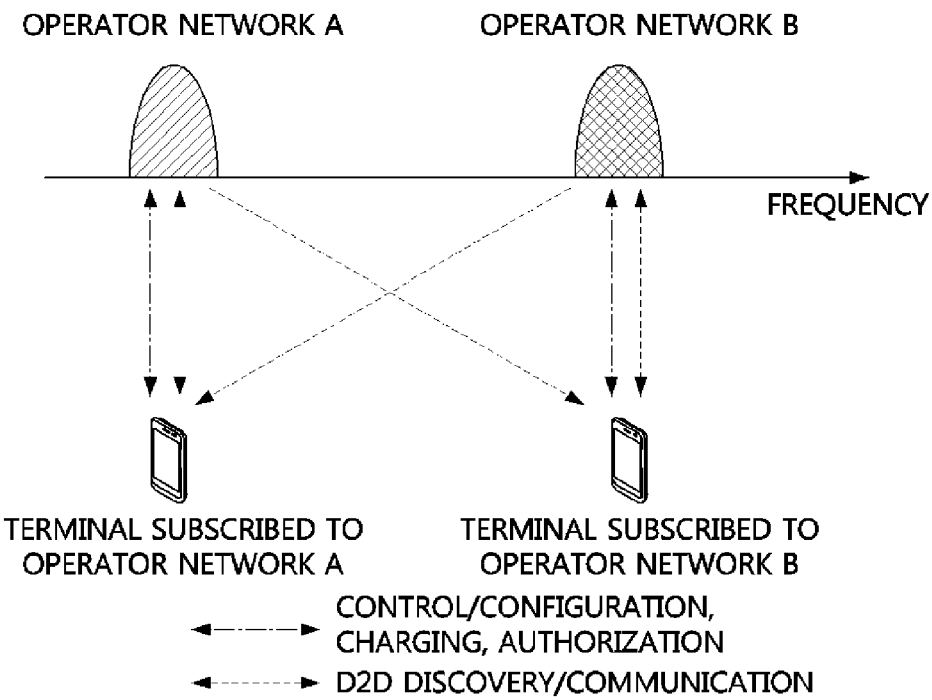
FIG. 2 is a conceptual diagram to depict a shared-type spectrum usage model.

FIG. 2 is a conceptual diagram to depict a shared-type spectrum usage model.

Referring to FIG. 2, features of the shared-type model are as follows.

Terminals may perform D2D discovery using a portion of cellular spectrum allocated to a respective mobile communication operator network.

That is, terminals may perform D2D discovery and communication by using the same carrier frequency with that of cellular communication or using carrier frequency separated from that of the cellular communication.

A control/configuration, an authentication, and a charging for the D2D discovery may performed via cellular network of operator which each terminal subscribes to.

In the shared-type usage model, the terminal can receive configuration information on radio resources for the D2D discovery used in its network or in other networks through system information block (SIB), in order to perform discovery on terminals which belong to other networks. The discoverable terminal may transmit a discovery message through a frequency spectrum of operator which the discoverable terminal subscribes to. The discovery terminal may receive at least one discovery message through spectrum of its network or spectrum of other networks and perform a D2D discovery procedure based on the received discovery message.

For the D2D discovery between terminals which subscribe to different operator networks, the terminal is required to be equipped with a receiver which can receive signal from the network of other operator. Alternatively, radio resources for the D2D discovery may be configured to be orthogonal in time domain, for no terminals equipped with the receiver which can receive signal from the network of other operator. Networks of operators may exchange configuration information such as radio resource for D2D discovery in order to support D2D discovery between terminals which subscribe to different operator networks.

Figure 3:
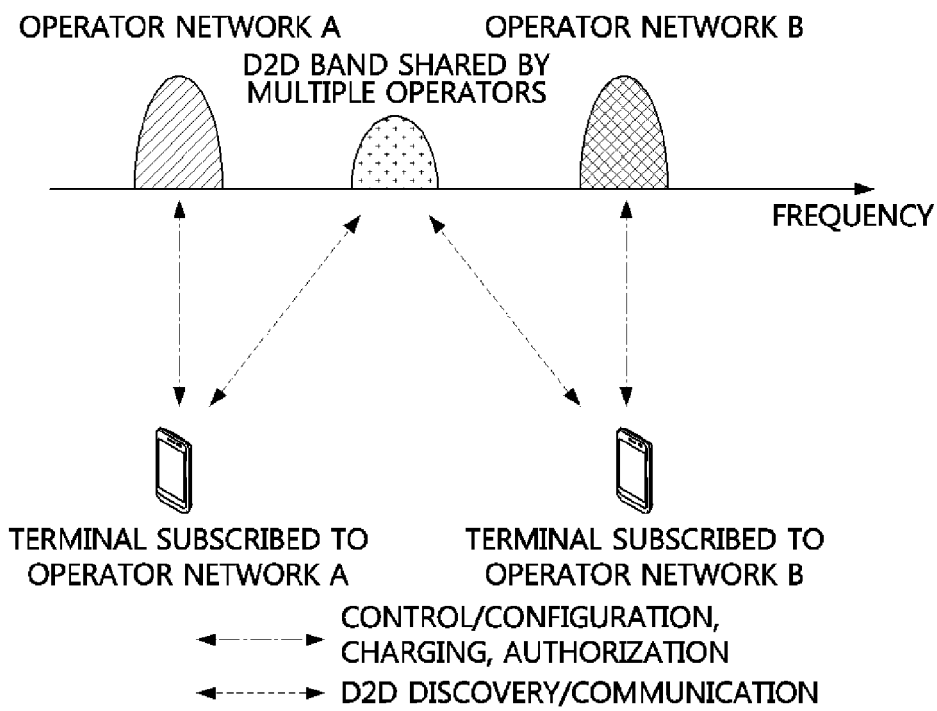
FIG. 3 is a conceptual diagram to depict a dedicated-type spectrum usage model.

FIG. 3 is a conceptual diagram to depict a dedicated-type spectrum usage model.

Referring to FIG. 3, features of the dedicated-type model, in which dedicated spectrum for D2D discovery is shared by a plurality of operators, are as follows.

Terminals may perform D2D discovery by using a dedicated spectrum separated from spectrum for cellular communication and shared by a plurality of mobile communication operators, for D2D discovery and communication.

A control/configuration, an authentication, and a charging for D2D discovery may performed through cellular spectrum.

In the dedicated-type spectrum usage model, terminals may obtain configuration information of radio resources, which belong to common shared spectrum and are used for D2D discovery, by using various signaling methods such as SIB signaling, from the network which each terminal subscribes to. The discoverable terminal may transmit a discovery message by using the common shared spectrum. The discovery terminal may receive at least one discovery message by using the same spectrum (that is, the common shared spectrum), and perform a D2D discovery procedure based on the received discovery message.

In this case, a respective terminal is required to be equipped with a receiver which can receive signal on the common spectrum, and networks of operators are required to share configuration information of radio resources in the common spectrum for D2D discovery.

In order to satisfy the above-mentioned requirements related to D2D discovery, a LTE system defines additional functional entities for D2D discovery and provides features of D2D discovery using the functional entities. For this, a Discovery Management Entity (DME) and a Discovery Management Function (DMF) may be introduced in the present invention. The DME is a functional entity which manages functions of D2D discovery and the DMF is a functional module which manages functions of D2D discovery.

Figure 4:
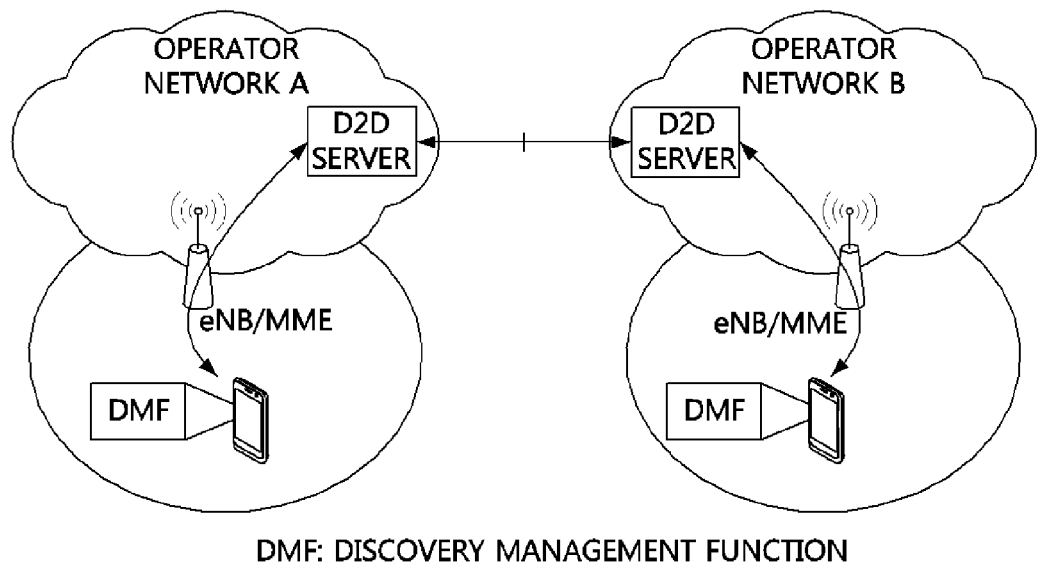
FIG. 4 is a conceptual diagram to depict a functional structure for D2D discovery.

FIG. 4 is a conceptual diagram to depict a functional structure for D2D discovery.

Referring to FIG. 4, a D2D server is a functional entity located in a LTE network for D2D discovery. The DMF is a functional entity which is located in a terminal, and interworks with the D2D server in order to manage discovery functions.

The D2D server may perform generating and issuing discovery identifiers, storing discovery related information of terminal, exchanging information for D2D discovery between mobile network operators, and interworking with existing functional entities of LTE network. The D2D may exist as an independent functional entity of LTE network to perform control functions for D2D discovery. Also, a mobile network operator may provide D2D discovery service by using at least one D2D server. Also, an interface between D2D servers may be provided for discovery service between operators, the D2D servers may exchange configuration information related to discovery by using the interface.

In the present invention, it is supposed that D2D server exists as an independent functional entity, and each mobile network operator provides D2D discovery service by using a logical D2D server.

Figure 5:
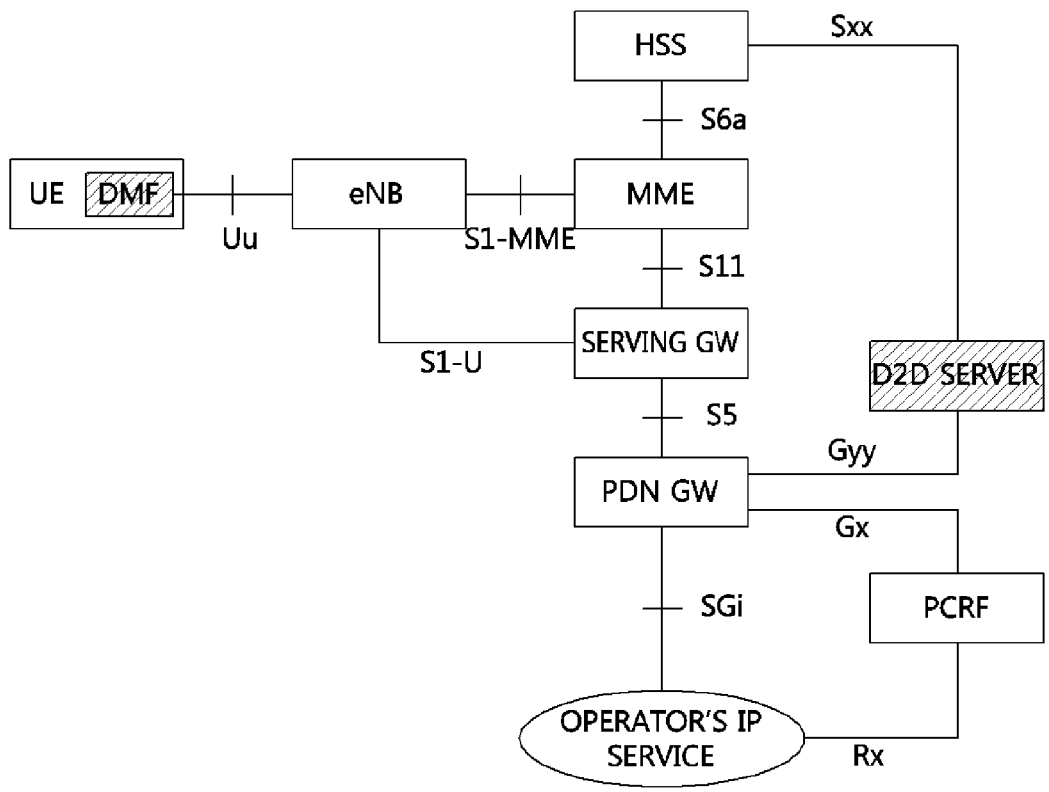
FIG. 5 is a conceptual diagram to depict a structure of LTE network for D2D discovery.

FIG. 5 is a conceptual diagram to depict a structure of LTE network for D2D discovery.

Referring to FIG. 5, the D2D server may interwork with other functional entities of LTE network, such as a Home Subscriber Server (HSS) and a Packet Data Network gateway (PDN GW), by using additional reference points, for example, Sxx or Gyy.

The DMF located in terminal may store information related to D2D discovery, and perform procedures of D2D discovery based on the stored information by interworking with functions of LTE protocol, to which functions related to D2D discovery are added, and D2D discovery applications. Similarly to D2D server explained above, DMF may be included in existing protocol function of terminal, or exists as an independent functional entity. In the present invention, it is supposed that DMF exists as a functional entity independent to terminal.

In the present invention, DMF and D2D server may operate as control plane function or user plane function. When DMF and D2D server operate as control plane function, functions of DMF and D2D server operate in a level of NAS protocol or in a state which the functions of DMF and D2D server are included in the NAS protocol and operate by interworking with control plane protocol of LTE functional node. When DMF and D2D server operate as user plane function, DMF and D2D server are located in a level of application, and exchange control information related D2D discovery through user plane.

Figure 6:
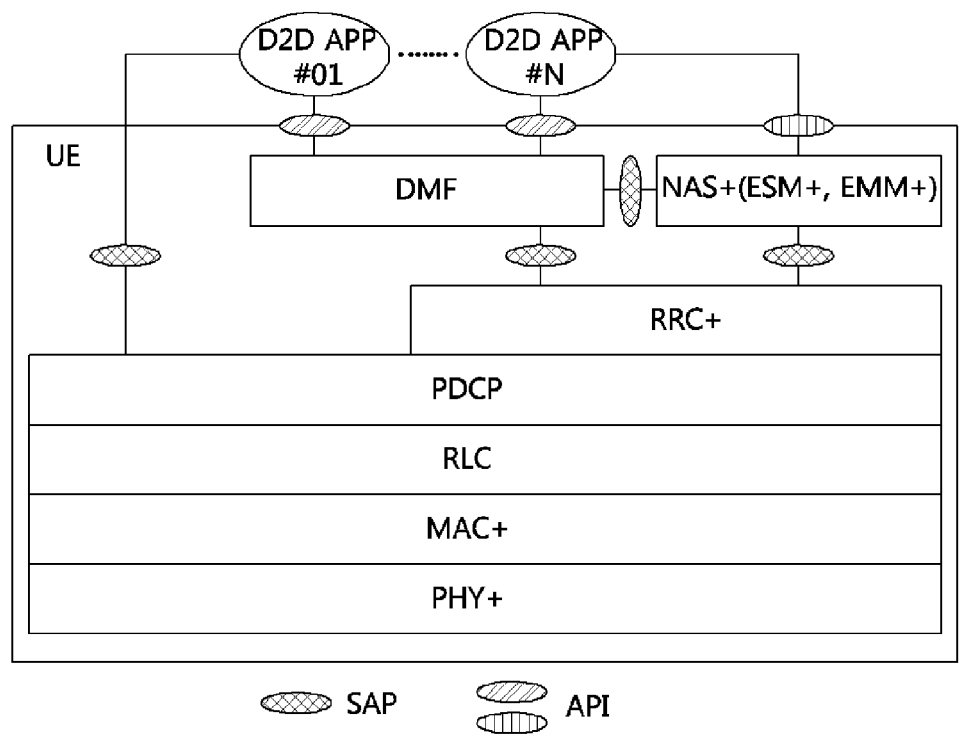
FIG. 6 is a conceptual diagram to show an example embodiment of a functional structure of user terminal for D2D discovery in the case that DMF operates as control plane function.

FIG. 6 is a conceptual diagram to show an example embodiment of a functional structure of user terminal for D2D discovery in the case that DMF operates as control plane function.

Referring to FIG. 6, in a protocol stack for D2D discovery, a RRC+ layer, a MAC+ layer, and a PHY+ layer may mean a configuration including additional functions for D2D discovery.

Figure 7:
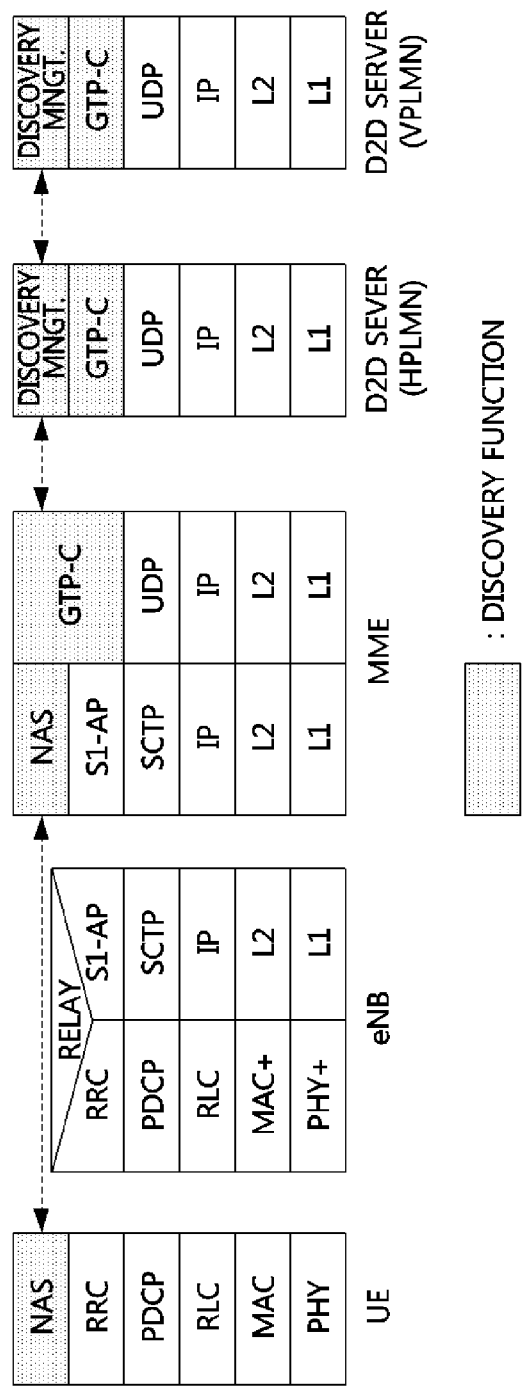
FIG. 7 is a conceptual diagram to show a structure of interworking protocols for D2D discovery when D2D server operates as control plane function.

FIG. 7 is a conceptual diagram to show a structure of interworking protocols for D2D discovery when D2D server operates as control plane function.

Referring to FIG. 7, a NAS layer of terminal (UE) may interwork with a NAS layer of a Mobility Management Entity (MME). A general packet radio service tunneling protocol-control plane (GTP-C) layer of MME may interwork with a discovery management layer of D2D server (HPLMN). The discovery management Layer of D2D server (HPLMN) may interwork with a discovery management layer of D2D server (VPLMN).

Figure 8:
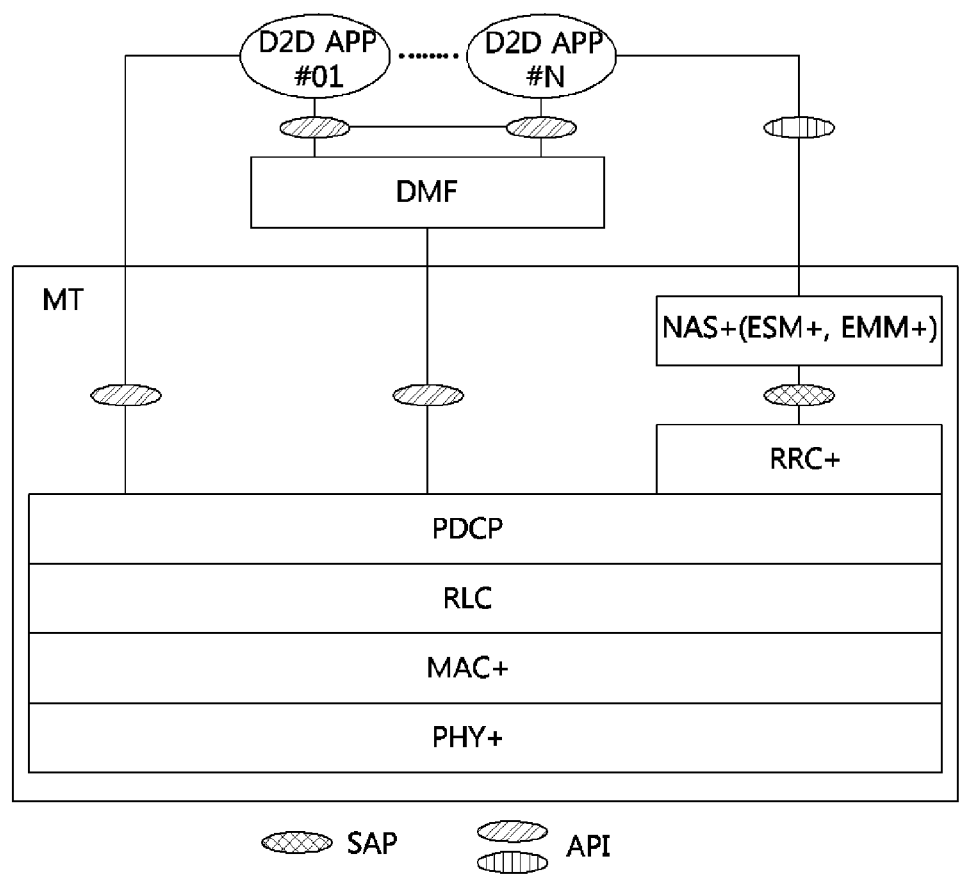
FIG. 8 is a conceptual diagram to show an example embodiment of a functional structure of user terminal for D2D discovery in the case that DMF operates as user plane function.

FIG. 8 is a conceptual diagram to show an example embodiment of a functional structure of user terminal for D2D discovery in the case that DMF operates as user plane function.

Referring to FIG. 8, in a protocol stack for D2D discovery, a RRC+ layer, a MAC+ layer, and a PHY+ layer may mean a configuration including additional functions for D2D discovery.

Figure 9:
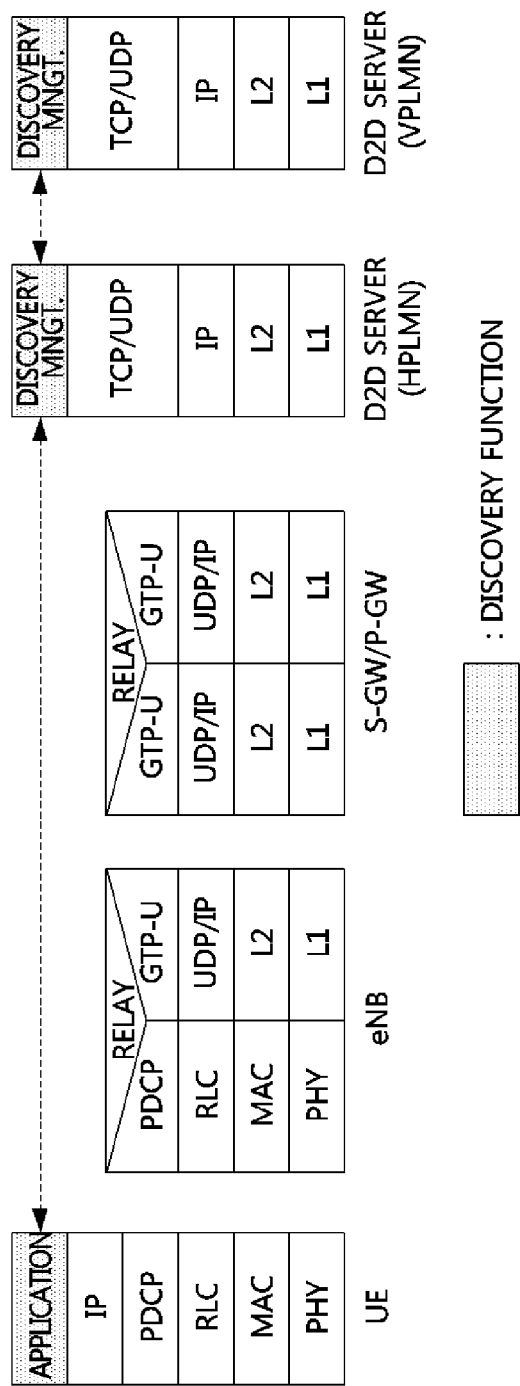
FIG. 9 is a conceptual diagram to show a structure of interworking protocols for D2D discovery when D2D server operates as user plane function.

FIG. 9 is a conceptual diagram to show a structure of interworking protocols for D2D discovery when D2D server operates as user plane function.

Referring to FIG. 9, an application layer of terminal (UE) may interwork with a discovery management layer of a D2D server (HPLMN). A discovery management layer of D2D server (HPLMN) may interwork with a discovery management layer of D2D server (VPLMN).

FIG. 10 is a conceptual diagram to show a channel mapping for D2D discovery message transmission/reception procedure.

Referring to FIG. 10, a Device Discovery Channel (DDCH), a Discovery Channel (DCH), and a Physical Discovery Channel (PDCH), which are newly defined in an uplink, may be used for discovery message transmission/ reception procedure between terminals.

When DMF operates as a function of control plane, a control protocol procedure for D2D discovery may use an existing layer structure and uplink/downlink channels of LTE system. That is, a Dedicated Control Channel (DCCH), a Downlink Shared Channel (DL-SCH), and a Physical Downlink Shared Channel (PDSCH) on downlink may be used, and a DCCH, an Uplink Shared Channel (UL-SCH), and a Physical Uplink Shared Channel (PUSCH) on uplink may be used.

When DMF operates as a function of user plane, a control protocol procedure for D2D discovery may use an existing layer structure and uplink/downlink channels of LTE system. That is, a Dedicated Traffic Channel (DTCH), a Downlink Shared Channel (DL-SCH), and a Physical Downlink Shared Channel (PDSCH) on downlink may be used, and a DTCH, an Uplink Shared Channel (UL-SCH), and a Physical Uplink Shared Channel (PUSCH) on uplink may be used.

Also, a mobile network operator may provide a discovery interface server and a discovery application as well as the D2D server and DME, which are explained above, in order to enable user to make a subscription, a registration, and configuration of D2D discovery service. The discovery interface server and the discovery application mean a functional entity and a terminal application which are located out of operator network and provided by each operator for D2D discovery. The discovery interface server and the discovery application are one of operation methods provided by mobile network operator for providing discovery service.

The D2D server and DMF may manage states related to D2D discovery.

FIG. 11 is a conceptual diagram to show transmission and reception states of D2D discovery.

Referring to FIG. 11, an idle state means a state that procedures related to D2D discovery are not performed by a terminal, and a discovery state means a state that a terminal is receiving a discovery message. A discoverable state means a state that a terminal is transmitting a discovery message, and a discovery & discoverable state means a state that a terminal is transmitting and receiving a discovery message.

Restricted Discovery

A restricted discovery procedure is a procedure of discovering terminal based on reciprocal approval between a discoverable terminal and a discovery terminal. For this, a terminal mat perform procedures of generating and issuing restricted discovery information, authenticating a restricted discovery application, approving restricted discovery of discovery terminal and releasing approval of restricted discovery of discovery terminal, and perform a procedure for restricted discovery. The procedure for restricted discovery may include a procedure of transmitting and receiving discovery message, and identifying corresponding terminal using the received discovery message. A terminal which has finished the procedure for restricted discovery may perform a procedure of reporting information obtained through the procedure of discovery and events related to discovery.

In performing the procedure of restricted discovery explained above, terminals managed by different operators or different D2D servers may perform a procedure of restricted discovery including a procedure of interworking between the D2D servers.

Hereinafter, for a case that D2D discovery operates as control plane function and a case that D2D discovery operates as user plane function, operation procedure of each case will be explained.

Each functional entity for restricted discovery may perform functions as follows.

D2D server (network)
Function
Generating and issuing discovery identifier (ID)
Authentication of 3rd party application
Managing discovery information (terminal identifier, discovery identifier, discovery range class)
Managing discovery configuration information (discovery type, discovery state)
Managing identifier of terminals which agreed restricted discovery service
Mediating information of restricted discovery by interworking with other D2D server
Managing searched information
Performing a procedure of D2D discovery by interworking with DMF
Interworking with LTE network functional entities (for example, MME, eNB, HSS, etc.) for authentication and charging
Stored information
Terminal ID, discovery ID, discovery range class
Discovery type, discovery state
A list of terminals which agreed restricted discovery service
Discovery information reported as a result of D2D discovery
Information on contracts of $3^{rd}$ party applications
DMF (terminal)
Function
Storing and managing its issued discovery ID
Managing discoverable terminal IDs (terminal ID, discovery ID)
Supporting authentication of $3^{rd}$ party application
Generating and transmitting restricted discovery message
Receiving and analyzing restricted discovery message
Reporting an ID identified through D2D discovery procedure and charging information
Performing a protocol procedure for D2D discovery by interworking with D2D server
Interworking with discovery related applications and LTE terminal protocol
Stored information
Its discovery ID assigned at the time of requesting discovery
Discovery ID of discoverable terminal assigned at the time of requesting discovery
A list of discoverable terminals
Generating and Issuing Restricted Discovery Information
A procedure of generating and issuing restricted discovery information may include a step that mobile network operator generates and issues discovery identifier for restricted discovery service, and a step that a terminal stores the discovery identifier.

The step of generating and issuing discovery identifier for restricted discovery may be performed when a terminal is opened or when necessary (for example, subscription of D2D discovery service or request of D2D discovery service). In the case of performing the step, a D2D server may issue a discovery ID of a subscribed terminal and store and manage the discovery ID and a terminal ID of the corresponding terminal. The terminal may store the discovery ID issued by the mobile network operator.

The discovery ID issued according to the above-mentioned step is an identifier which cannot be used for identifying a specific user, and may be used for transmitting restricted discovery information. Also, an open discovery service and a restricted discovery service may share and use the same discovery identifier.

Classification of Type of Generating and Issuing Restricted Discovery ID
A D2D server may generate and issue discovery ID when an user terminal subscribes to (or, is opened by) a specific mobile network operator.
A D2D server may generate and issue discovery ID when an user terminal subscribes to D2D discovery service or requests D2D discovery service.
A terminal may subscribe to restricted discovery service according to user's request. That is, the user may access the discovery interface server of a mobile network operator by an application of terminal or PC, and subscribe to the restricted discovery service or cancel the subscription of the restricted discovery service.

In the above-described operation procedure, a method that the D2D server generates and issues discovery ID when the terminal subscribes to and request D2D discovery service has been described. However, an alternative method, that the D2D server generates and issues discovery ID when the user terminal subscribes to (or, is opened by) a specific mobile network operator, is also possible.

Authentication of Restricted Discovery Application
An authentication of restricted discovery application may mean an authentication procedure performed for applications located in a terminal to use features of restricted discovery. This authentication procedure may mean a procedure authenticating whether a specific application developed by a $3^{rd}$ party developer may use the features of restricted discovery or not. For this, the $3^{rd}$ party developer is required to make contracts on using the features of restricted discovery in the corresponding application with the mobile network operator in advance. The authentication procedure on using restricted discovery service of a specific application may be performed, only when the corresponding application is used for the first time or every time the corresponding application is executed, according to a configuration of operator network.

In the authentication procedure, a case that the terminal is located in a network which the terminal subscribes to and a case that the terminal is located in a roaming operator network, may be considered. In the case that the terminal is located in the roaming operator network, the authentication procedure may be performed by interworking between D2D servers.

Figure 12:
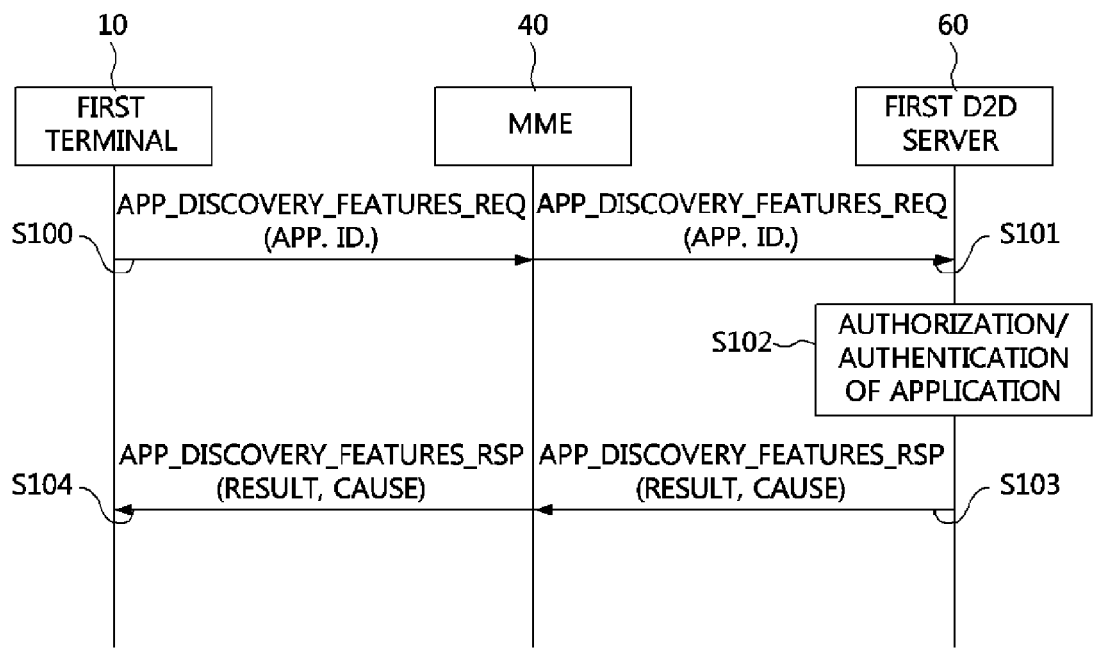
FIG. 12 is a sequence chart to show an authentication procedure on restricted discovery application using control plane function.

FIG. 12 is a sequence chart to show an authentication procedure on restricted discovery application using control plane function.

Referring to FIG. 12, a first terminal 10 may transmit an authentication request message (APP_DISCOVERY_FEATURES_REQ) to a MME 40 (S100), the MME 40 may transmit the authentication request message received from the first terminal 10 to a first D2D server 60 (S101). The authentication request message means a message requesting an authentication on using restricted discovery service by a specific application, and may include an application ID and information on the first terminal ID, etc.

The first D2D server 60 may perform an approval/authentication on a specific application based on information included in the authentication request message (S102). After a completion of approval/authentication on the application, the first D2D server 60 may transmit an authentication response message (APP_DISCOVERY_FEATURES_RSP) including an approval/authentication result information to the MME 40 (S103). The MME 40 may transmit the authentication response message received from the first D2D server 60 to the first terminal 10 (S104). The authentication response message means a message indicating whether or not the application can use the restricted discovery service, and may include a result, a cause of the result, and etc.

Figure 13:
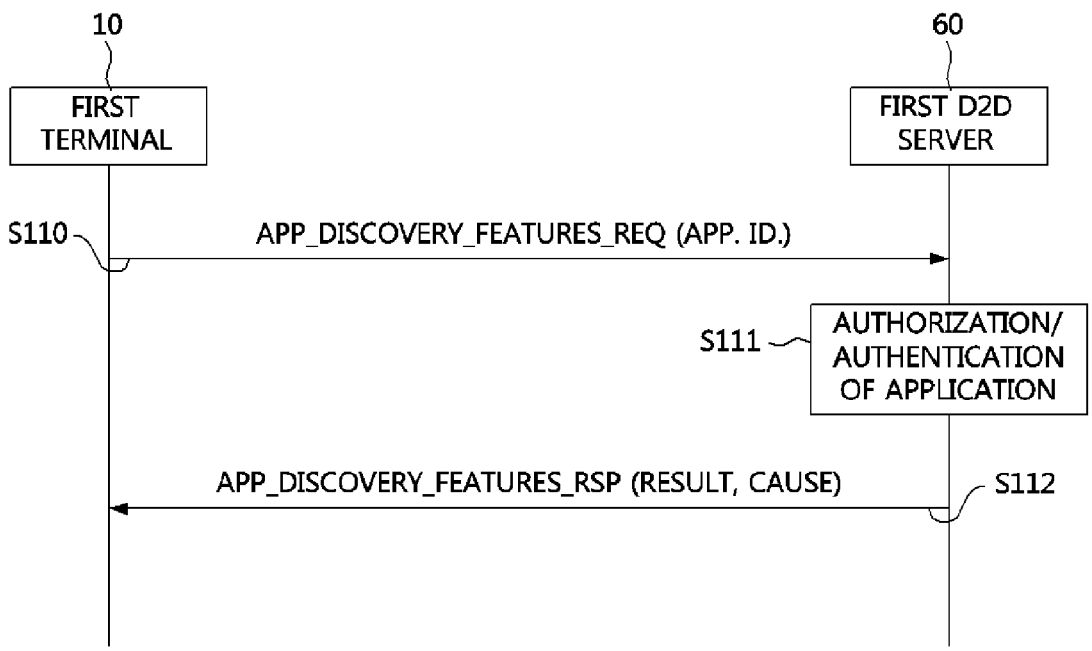
FIG. 13 is a sequence chart to show an authentication procedure on restricted discovery application using user plane function.

FIG. 13 is a sequence chart to show an authentication procedure on restricted discovery application using user plane function.

Referring to FIG. 13, a first terminal 10 may transmit an authentication request message (APP_DISCOVERY_FEATURES_REQ) to a first D2D server 60 (S110). The authentication request message means a message requesting an authentication on using restricted discovery service by a specific application, and may include an application ID and information on the first terminal ID, etc. The first D2D server 60 may perform an approval/authentication on a specific application based on information included in the authentication request message (S111). After a completion of approval/authentication on the application, the first D2D server 60 may transmit an authentication response message (APP_DISCOVERY_FEATURES_RSP) including an approval/authentication result information to the first terminal 10 (S112). The authentication response message means a message indicating whether or not the application can use the restricted discovery service, and may include a result, a cause of the result, and etc.

Approving and Canceling Approval of Restricted Discovery

A procedure of approving and canceling approval of restricted discovery means a procedure of making reciprocal approvals between terminals for the restricted discovery service or canceling agreement established. For the restricted discovery approval procedure, the discovery application may perform a procedure of approval of restricted discovery service in a level of application, then, may instruct a procedure of approval of restricted discovery with a counterpart terminal to the DMF.

The DMF, which is instructed to perform the procedure of approval of restricted discovery, may transmit an approval request message, including a target terminal ID which is requested to approve of and an operation flag ('set' or 'clear'), to the D2D server. The D2D server may transmit the approval request message received from the DMF to the target terminal, and receive a response message in response to the approval request message from the target terminal.

In the procedure of approving and cancelling approval, the operation flag is set to 'set' when approval is requested and the operation flag is set to 'clear' when cancelling approval is requested. When a response message to an approval request message is received from the target terminal, the D2D server may update a list of discoverable terminals based on the information included in the response message, and transmit the response message to the DMF of a discovery terminal. The DMF of the discovery terminal which requested approval or cancelling approval may update a list of discoverable terminals based on the response message to the approval request message.

Figure 14:
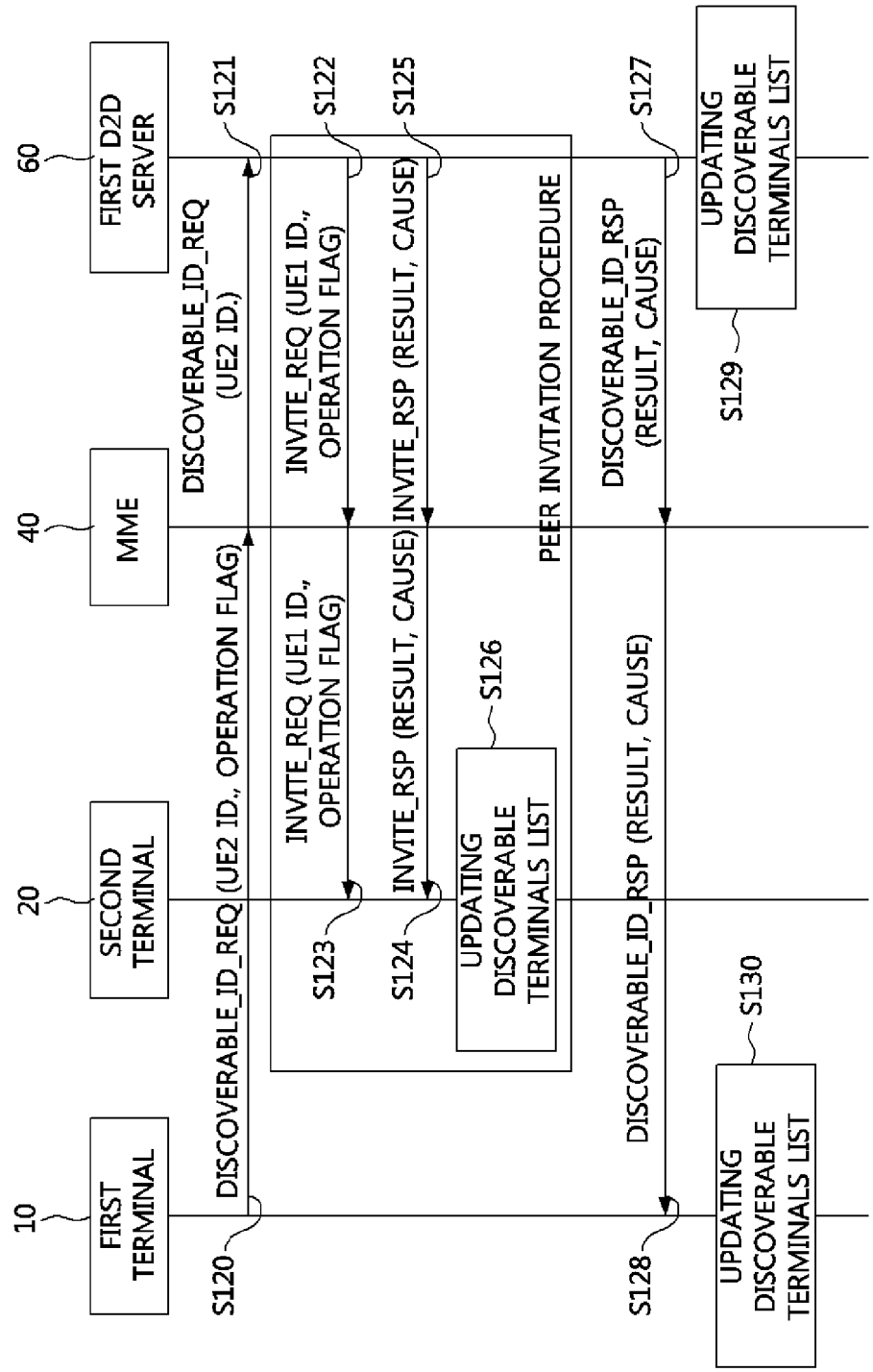
FIG. 14 is a sequence chart to show a procedure of approval and canceling approval of restricted discovery using control plane function.

FIG. 14 is a sequence chart to show a procedure of approval and canceling approval of restricted discovery using control plane function.

Referring to FIG. 14, a first terminal 10 (that is, discovery terminal) may transmit a discoverable ID request message (DISCOVERABLE_ID_REQ) to a MME 40 (S120), the MME 40 may transmit the discoverable ID request message received from the first terminal 10 to a first D2D server 60 (S121). The discoverable ID request message means a message requesting an update to the list of discoverable terminals, and may include a target terminal ID (that is, a second terminal ID), an operation flag, an application ID, and etc.

The first D2D server 60 may transmit an invite request message requesting restricted discovery approval (INVITE_REQ) to the MME 40 (S122), the MME 40 may transmit the invite request message received from the first D2D server 60 to the second terminal 20 (that is, target terminal) (S123). The invite request message means a message which is used to request an addition of terminal into the list of discoverable terminals, and may include a first terminal ID, an operation flag, a target terminal ID, and information of application ID, etc.

The second terminal 20 may determine whether to approve the restricted discovery or to cancel the approval based on the received the invite request message, and transmit an invite response message (INVITE_RSP) including a determined result information to the MME 40 (S124). The MME 40 may transmit the invite response message received from the second terminal 20 to the first D2D server 60 (S125). The invite response message means a message used for adding the terminal in the list of discoverable terminals, and may include information on a result and a cause of the result. On the other hand, the second terminal 20 may update the list of discoverable terminals based on the result (that is, on whether to approve or to cancel approval) (S126).

The first D2D server 60 may generate a discoverable ID response message (DISCOVERABLE_ID_RSP) based on the information include in the invite response message received from the second terminal 20, and transmit the discoverable ID response message to the MME 40 (S127). The MME 40 may transmit the discoverable ID response message received from the first D2D server 60 to the first terminal 10 (S128). The discoverable ID response message means a response message on adding the terminal to the list of discoverable terminals, and may include information on a result, a cause of the result, and an ID of the target terminal, etc.

Meanwhile, the first D2D server 60 may update the list of discoverable terminals based on the information included in the discoverable ID response message (S129), and the first terminal 10 may also update the list of discoverable terminals based on the information include in the discoverable ID response message (S130).

Figure 15:
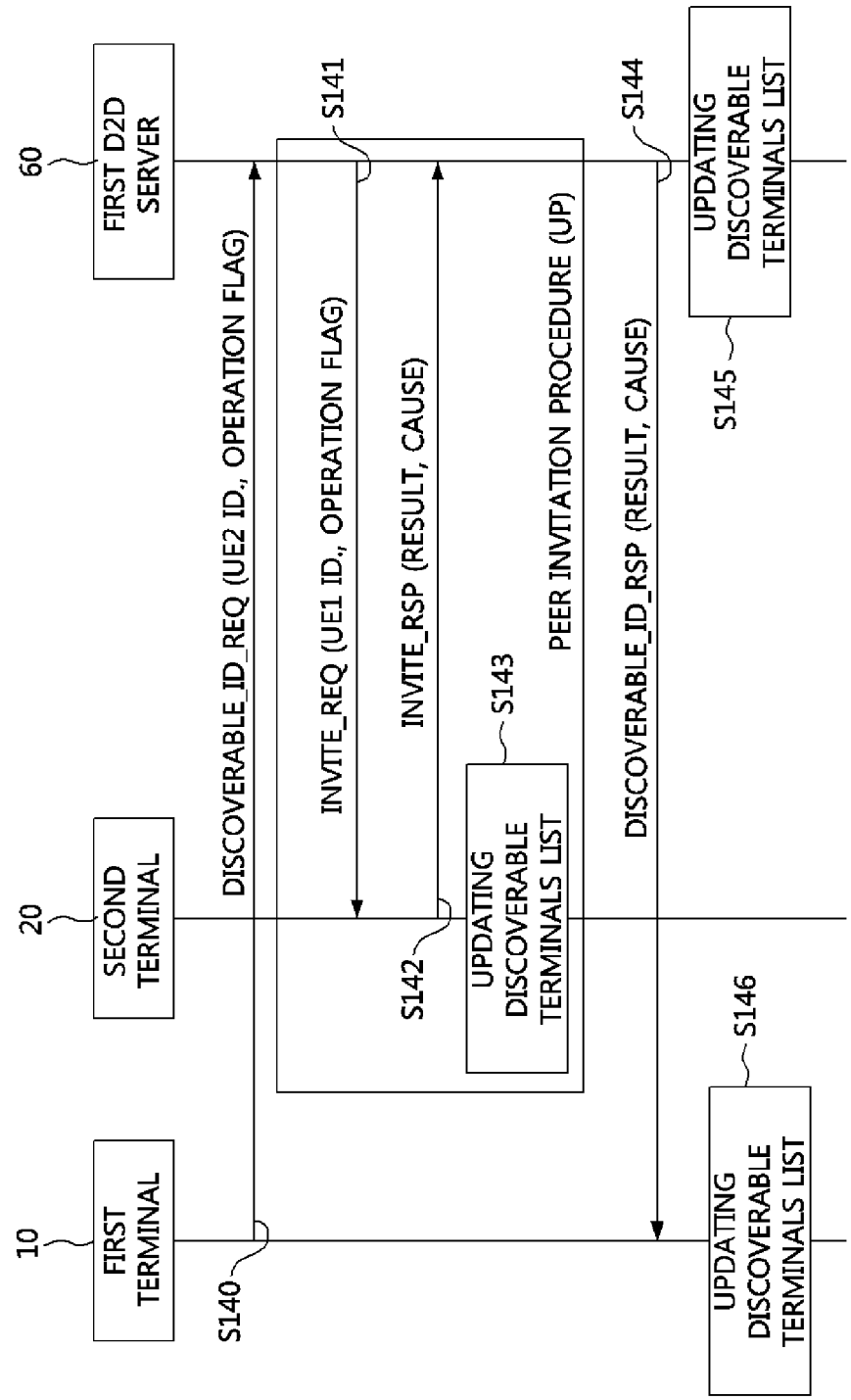
FIG. 15 is a sequence chart to show a procedure of approval and canceling approval of restricted discovery using user plane function.

FIG. 15 is a sequence chart to show a procedure of approval and canceling approval of restricted discovery using user plane function.

Referring to FIG. 15, a first terminal 10 (that is, a discovery terminal) may transmit a discoverable ID request message (DISCOVERABLE_ID_REQ) to a first D2D server (S140). The discoverable ID request message means a message requesting an update to the list of discoverable terminals, and may include a target terminal ID (that is, a second terminal ID), an operation flag, an application ID, and etc.

The first D2D server 60 may transmit an invite request message requesting restricted discovery approval (INVITE_REQ) to a second terminal 20 (S141). The invite request message means a message which is used to request an addition of terminal into the list of discoverable terminals, and may include a first terminal ID, an operation flag, a target terminal ID, and information of application ID, etc.

The second terminal 20 may determine whether to approve the restricted discovery or to cancel the approval based on the received the invite request message, and transmit an invite response message (INVITE_RSP) including a determined result information to the first D2D server 60 (S142). The invite response message means a message used for adding the terminal in the list of discoverable terminals, and may include information on a result and a cause of the result. On the other hand, the second terminal 20 may update the list of discoverable terminals based on the result (that is, on whether to approve or to cancel approval) (S143).

The first D2D server 60 may generate a discoverable ID response message based on the information include in the invite response message received from the second terminal 20, and transmit the discoverable ID response message to the first terminal 10 (S144). The discoverable ID response message means a response message on adding the terminal to the list of discoverable terminals, and may include information on a result, a cause of the result, an ID of the target terminal, etc.

Meanwhile, the first D2D server 60 may update the list of discoverable terminals based on the information included in the discoverable ID response message (S145), and the first terminal 10 may also update the list based on the information include in the discoverable ID response message (S146).

Restricted Discovery Service for a Specific Terminal

A restricted discovery service for a specific terminal means a restricted discovery to discover a specific terminal designated by a user. A procedure for this may be started by a request of an application to discover a specific terminal, and the discovery service may be performed during a predetermined period or until canceling the discovery by the application according to a configuration of operation mode. In addition, a counterpart discoverable terminal (the specific terminal), as well as a terminal which requested discovery, may discover a counterpart terminal (that is, finding that it is adjacent) through this procedure.

The restricted discovery service may use a control plane or a data plane, each case will be explained hereinafter.

Restricted Discovery Using a Control Plane

A procedure (activation/deactivation) for the restricted discovery service using a control plane is explained. In the case that a D2D discovery service is provided using a control plane, a DMF of a terminal may operate by interworking with a D2D server through an eNB/MME, a serving gateway (S-GW), and a packet data network gateway (P-GW). Here, a terminal desiring to discover a specific terminal may be defined as a first terminal (namely, a discovery terminal), and a terminal desiring to be discovered may be defined as a second terminal (namely, a discoverable terminal). Also, a procedure explained below supposes that the first terminal and the second terminal are in idle states at a starting time.

Figure 16:
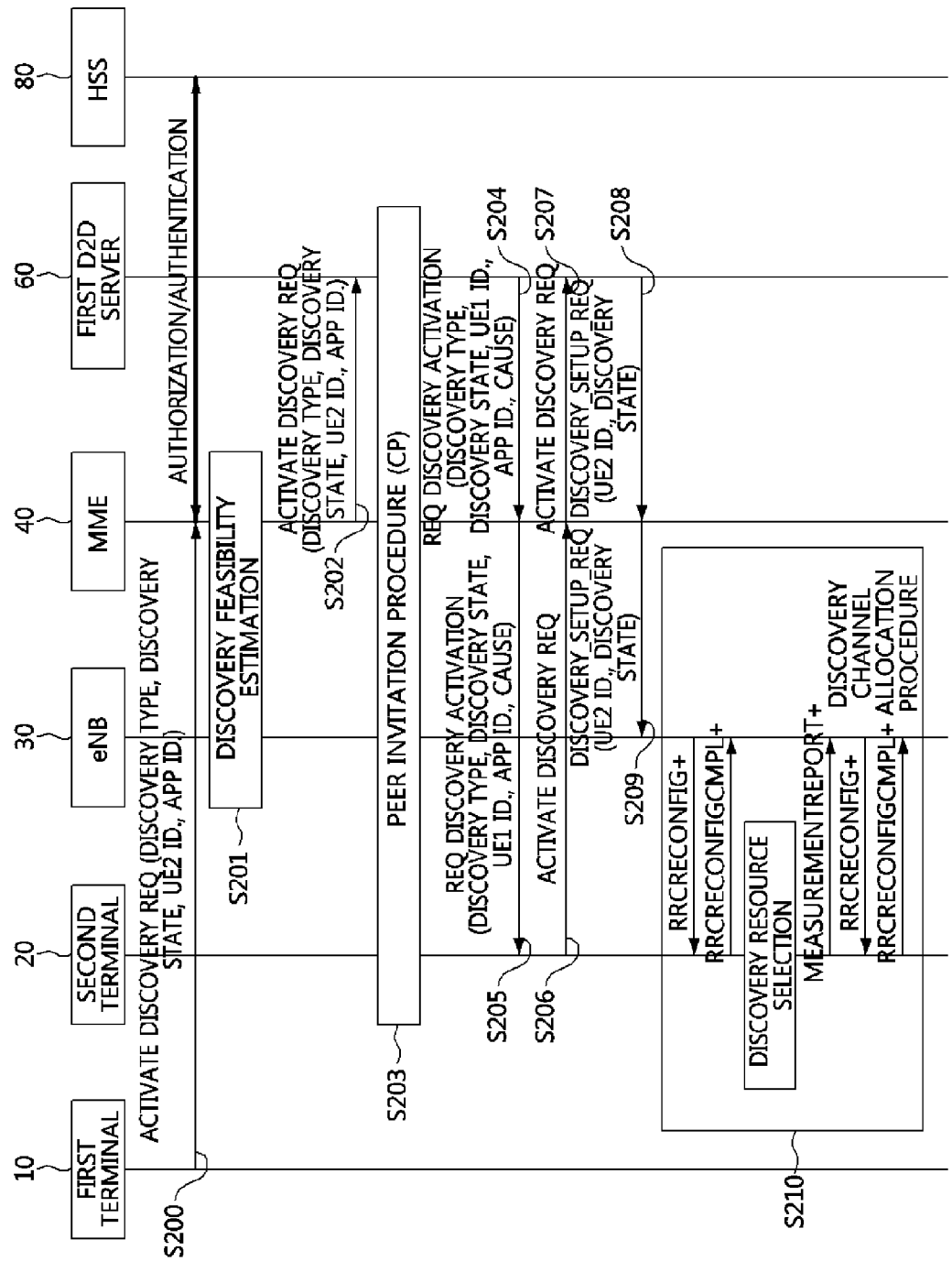
FIG. 16 is a sequence chart to show an activation procedure (S200~S210) of restricted discovery service using control plane.
Figure 17:
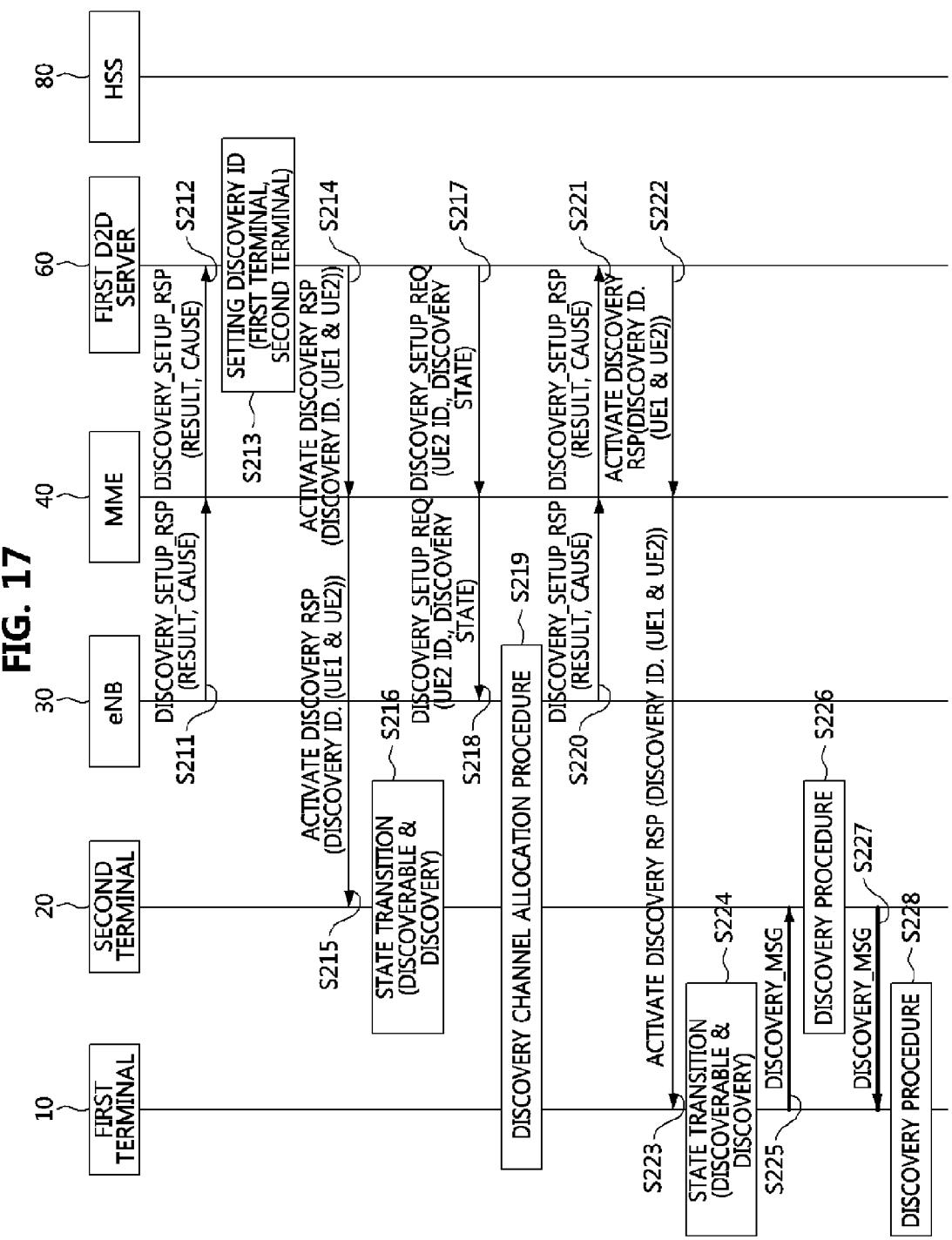
FIG. 17 is a sequence chart to show an activation procedure (S211~S228) of restricted discovery service using control plane.

FIG. 16 is a sequence chart to show an activation procedure (S200~S210) of restricted discovery service using control plane, and FIG. 17 is a sequence chart to show a deactivation procedure (S211~S228) of restricted discovery service using control plane.

Referring to FIG. 16 and FIG. 17, the activation procedure of restricted discovery service using control plane is as follows.

In order to activate the restricted discovery service, a DMF of the first terminal 10 may transmit a discovery activation request message (ACTIVATE_DISCOVERY_REQ) including information including a discovery type, a discovery state, a second terminal ID, and an application ID (app id) to a MME 40 (S200). The MME 40 may determine whether to make the first terminal 10 and the second terminal 20 perform the discovery or not, when the discovery activation request message on the specific terminal is received from the first terminal 10 (S201). That is, the MME 40 may determine whether or not to perform the discovery based on information on serving cells and positions of the first and the second terminals 10 and 20. When performing the discovery is possible, the MME 40 may transmit an activation request message for the restricted discovery service to a first D2D server 60 (S202).

When the discovery activation request message is received from the MME 40, the first D2D server 60 may check whether the restricted discovery service between the first terminal 10 and the second terminal 20 is approved or not. If a reciprocal approval of the restricted discovery service does not exist, a peer invite procedure between the first D2D server 60 and the second terminal 20 may be performed (S203). If the reciprocal approval of the restricted discovery service exists, the first D2D server 60 may not perform the peer invite procedure.

After performing the above procedure, the first D2D server 60 may transmit a discovery request message (REQ_DISCOVERY_ACTIVATION) to the MME 40 which the second terminal 20 belongs to (S204). The MME 40 may transmit the received discovery request message to a DMF of the second terminal 20 (S205). The discovery request message may information on a discovery type, a discovery state, a cause, a first terminal ID, an application ID (app id), etc.

When the discovery request message is received, a DMF of the second terminal 20 may perform a procedure responding the discovery request. When the discovery instructed by the network is accepted, the DMF of the second terminal 20 may transmit a discovery activation request message (ACTIVATE_DISCOVERY_REQ) to the MME 40 (S206). The MME 40 may transmit the received discovery activation request message to the first D2D server 60 (S207). On the contrary, when the discovery instructed by the network is not accepted, a DMF of the second terminal 20 may transmit a discovery activation rejection message including a cause code to the MME 40. The MME 40 may the received discovery activation rejection message to the first D2D server 60.

When the discovery activation request message is received from the second terminal 20, the first D2D server 60 may perform a procedure of configuring discovery resources which will be used by the second terminal 20. For the configuration of discovery resources, the first D2D server 60 may transmit a discovery resource configuration request message (DISCOVERY_SETUP_REQ) to the MME 40 (S208). The MME 40 which received the discovery resource configuration request message may instruct an eNB 30 to allocate discovery channel (S209). The discovery resource configuration request message may include a second terminal ID, discovery state information, etc.

When the allocation of discovery channel is requested by the MME 40, a function of a radio resource control (RRC) of the eNB 30 may perform a procedure of discovery channel allocation with the second terminal 20 (S210). The procedure of discovery channel allocation performed by the eNB 30 for the second terminal 20 may include a step that the second terminal 20 measures receiving characteristics of the discovery channels allocated by the system, a step that the second terminal selects candidate discovery channel(s) through which discovery message is transmitted based on the measured receiving characteristics, and reports it to the eNB 30, and a step that the eNB 30 designates radio resources, which the second terminal 20 will use, based on the candidate discovery channel(s) reported.

After a completion of the procedure of discovery channel allocation, the eNB 30 may report a discovery resource configuration response message (DISCOVERY_SETUP_RSP), including information on a result to the discovery channel allocation and a cause of the result, to the MME 40 (S211). The MME 40 may transmit the received discovery resource configuration response message to the first D2D server 60 (S212).

The first D2D server 60 may configure discovery IDs for the first terminal 10 and the second terminal 20 (S213). The first D2D server 60 may transmit a restricted discovery activation response message (ACTIVATE_DISCOVERY_RSP) including a discovery ID of the first terminal 10, a discovery ID of the second terminal 20 to the MME 40 (S214). The MME 40 may transmit the received restricted discovery activation response message to a DMF of the second terminal 20 (S215). When the restricted discovery activation response message is received, the DMF of the second terminal 20 may be transitioned to a discoverable & discovery state (S216), and then may start a procedure of transmitting and receiving discovery message (S225, S226, S227).

After a completion of discovery activation procedure of the second terminal 20, the first D2D server 60 may perform a procedure of configuring discover resource and a procedure of discovery channel allocation for the first terminal 10 (S217, S218, S219, S220, S221). The procedure of configuring discover resource and the procedure of discovery channel allocation for the first terminal 10 may be the same with the above-mentioned procedure of configuring discover resource and procedure of discovery channel allocation for the first terminal 20.

Then, the first D2D server 60 may transmit a restricted discovery activation response message including a discovery ID of the first terminal 10 and a discovery ID of the second terminal 20 to the MME 40 (S222). The MME 40 may transmit the received restricted discovery activation response message to the first terminal 10 (S223).

When the restricted discovery activation response message is received, the first terminal 10 may be transitioned to a discoverable & discovery state (S224), and then may perform a procedure of transmitting and receiving discovery message (S225, S227, S228).

That is, the DMF of the terminal which is transitioned to the discoverable & discovery state, such as the first terminal 10 or the second terminal 20, may receive the discovery message by searching configured radio resources, and identify whether a discovery ID included in the discovery message corresponds to the discovery ID which is received according to the above procedure. When the discovery ID included in the discovery message corresponds to the discovery ID which is received according to the above procedure, the DMF or the terminal may transmit a restricted discovery indication information to the application. On the contrary, when the discovery ID included in the discovery message does not correspond to the discovery ID which is received according to the above procedure, the DMF of the terminal may discard the discovery message.

Figure 18:
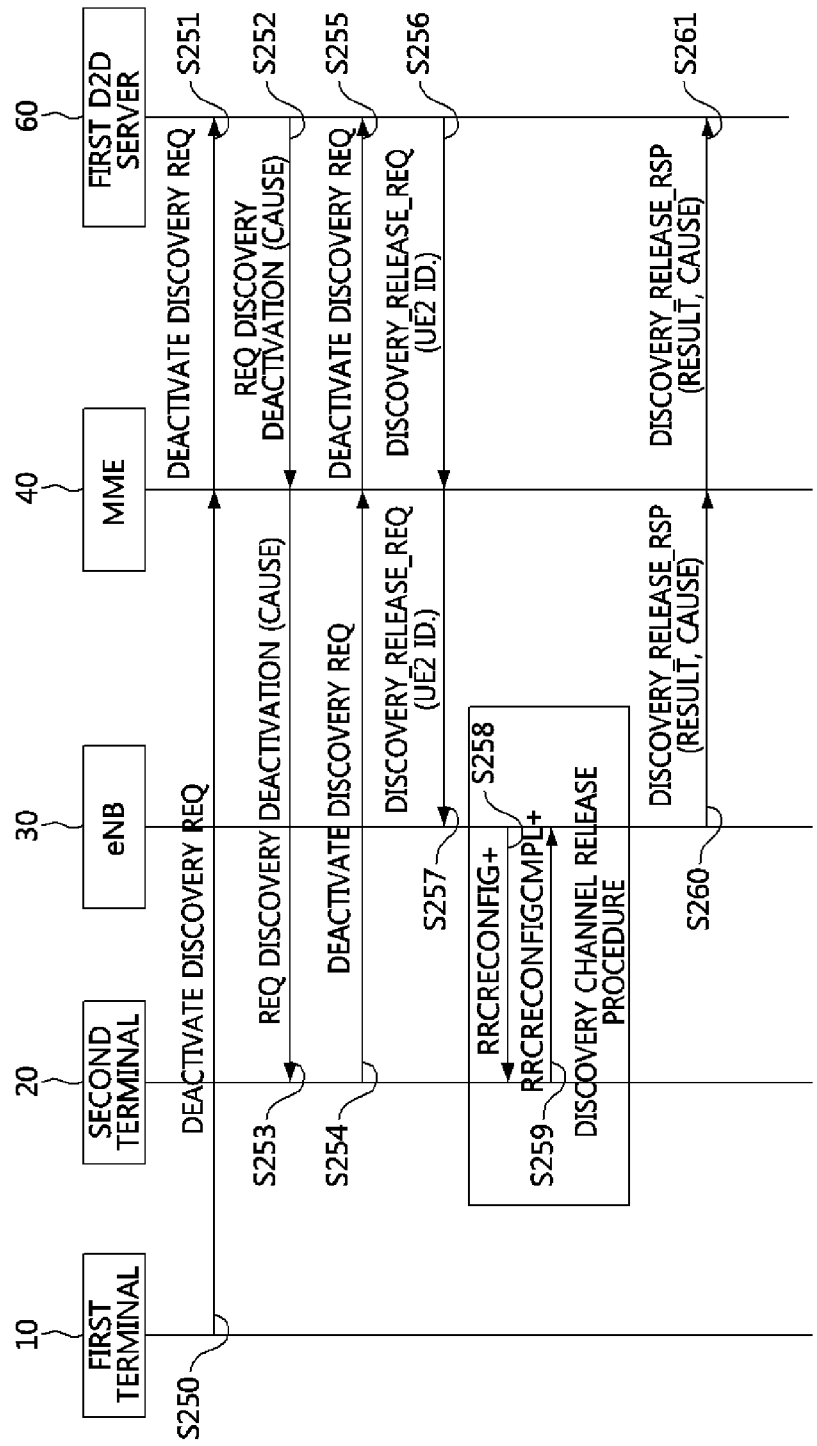
FIG. 18 is a sequence chart to show a deactivation procedure (S250~S261) of restricted discovery service using control plane.
Figure 19:
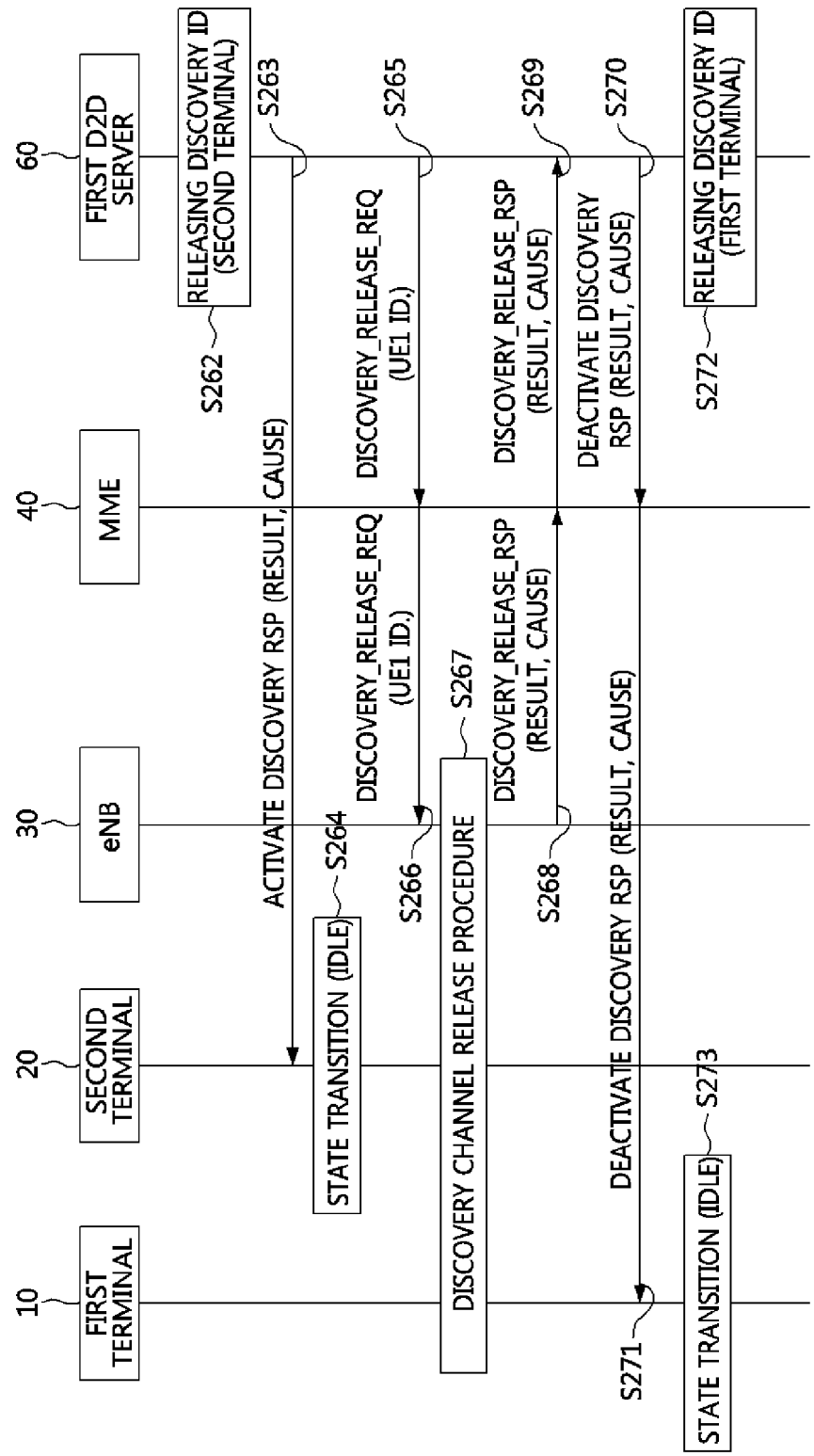
FIG. 19 is a sequence chart to show a deactivation procedure (S261~S273) of restricted discovery service using control plane.

FIG. 18 is a sequence chart to show a deactivation procedure (S250~S261) of restricted discovery service using control plane, and FIG. 19 is a sequence chart to show a deactivation procedure (S261~S273) of restricted discovery service using control plane.

Referring to FIG. 18 and FIG. 19, the deactivation procedure of restricted discovery service using control plane is as follows.

In order to deactivate the restricted discovery service using control plane, a DMF of the first terminal 10 may transmit a discovery deactivation request message (DEACTIVATE_DISCOVERY_REQ) to a MME 40 (S250). The MME 40 may transmit an deactivation request message to the first D2D server 60 (S251). The first D2D sever 60 may transmit a discovery deactivation request (REQ_DISCOVERY_DEACTIVATION) based on the discovery deactivation request message (S252, S253) to the second terminal 20, the second terminal 20 may transmit a discovery deactivation request message (DEACTIVATE_DISCOVERY_REQ), in response to the discovery deactivation request, to the first terminal 60 (S254, S255). Here, the information exchange between the second terminal 20 and the first D2D server 60 may be performed via the MME 40.

After then, the first D2D server 60 may perform a procedure of releasing radio resources allocated to the second terminal 20 to deactivate the restricted discovery service of the second terminal 20. That is, the first D2D server 60 may transmit a discovery release request message (DISCOVERY_RELEASE_REQ) requesting to release the radio resources to the MME 40 (S256). The MME 40 may transmit the discovery release request message received from the first D2D server 60 to the eNB 30 (S257). The discovery release request message may include a terminal ID, discovery state information, etc. The eNB 30 may perform the procedure of releasing radio resources with the second terminal 20, based on the information included in the discovery release request message (S258, S259).

After a completion of releasing radio resources, the eNB 30 may transmit a discovery release response message (DISCOVERY_RELEASE_RSP) to the MME 40 (S260). The MME 40 may transmit the discovery release response message received from the eNB 30 to the first D2D server 60 (S261). The discovery release response message means a response message in response to the radio resources release request, and may include a result of releasing radio resources, and a cause of the result.

After a completion of releasing radio resources, the first D2D server 60 may release a configuration of the discovery ID assigned for the second terminal 20 (S262). After the above procedure is completed, the first D2D server 60 may transmit a discovery deactivation response message (DEACTIVATE_DISCOVERY_RSP), as a response to the discovery deactivation request message received from the second terminal 20, to the second terminal 20 (S263). The discovery deactivation response message means a response message to the discovery deactivation request, and may include a result of discovery deactivation, and a cause of the result. Meanwhile, when the discovery deactivation response message is received from the first D2D server 60, the second terminal 20 may be transitioned to an idle state (S264). That is, the second terminal 20 stops transmitting and receiving discovery message.

After a completion of the procedure of deactivating the restricted discovery service for the second terminal 20, the first D2D server 60 may perform releasing radio resources allocated for the first terminal 10 for transmitting and receiving discovery message (S265, S266, S267, S268, S269). Here, the procedure of releasing radio resources allocated for the first terminal 10 may be the same with the procedure of releasing radio resources allocated for the first terminal 20, which has been explained above.

After a completion of releasing radio resources allocated for the first terminal 10, the first D2D server 60 may transmit a discovery deactivation response message (DEACTIVATE_DISCOVERY_RSP), as a response to the discovery deactivation request message received from the first terminal 10, to the MME 40 (S270). The MME 40 may transmit a discovery deactivation response message to the first terminal 10 (S271). Then, the first D2D server 60 may release a configuration of the discovery ID assigned for the first terminal 10 (S272). On the other hand, when the discovery deactivation response message is received from the first D2D server 60, the first terminal 10 may be transitioned to an idle state (S273). That is, the first terminal 10 stops transmitting and receiving discovery message.

Restricted Discovery Using an User Plane

Hereinafter, an operation procedure for restricted discovery service using an user plane will be explained. In the case that a D2D discovery service is provided using an user plane, a DMF of a terminal may operate by interworking with a D2D server through an eNB, a serving gateway (S-GW), and a packet data network gateway (P-GW), and may use a protocol of IP layer. Here, a terminal desiring to discover a specific terminal may be defined as a first terminal (namely, a discovery terminal), and a terminal desiring to be discovered may be defined as a second terminal (namely, a discoverable terminal). Also, it is supposed that the first terminal and the second terminal are in idle states at the starting time of the procedure explained below.

Figure 20:
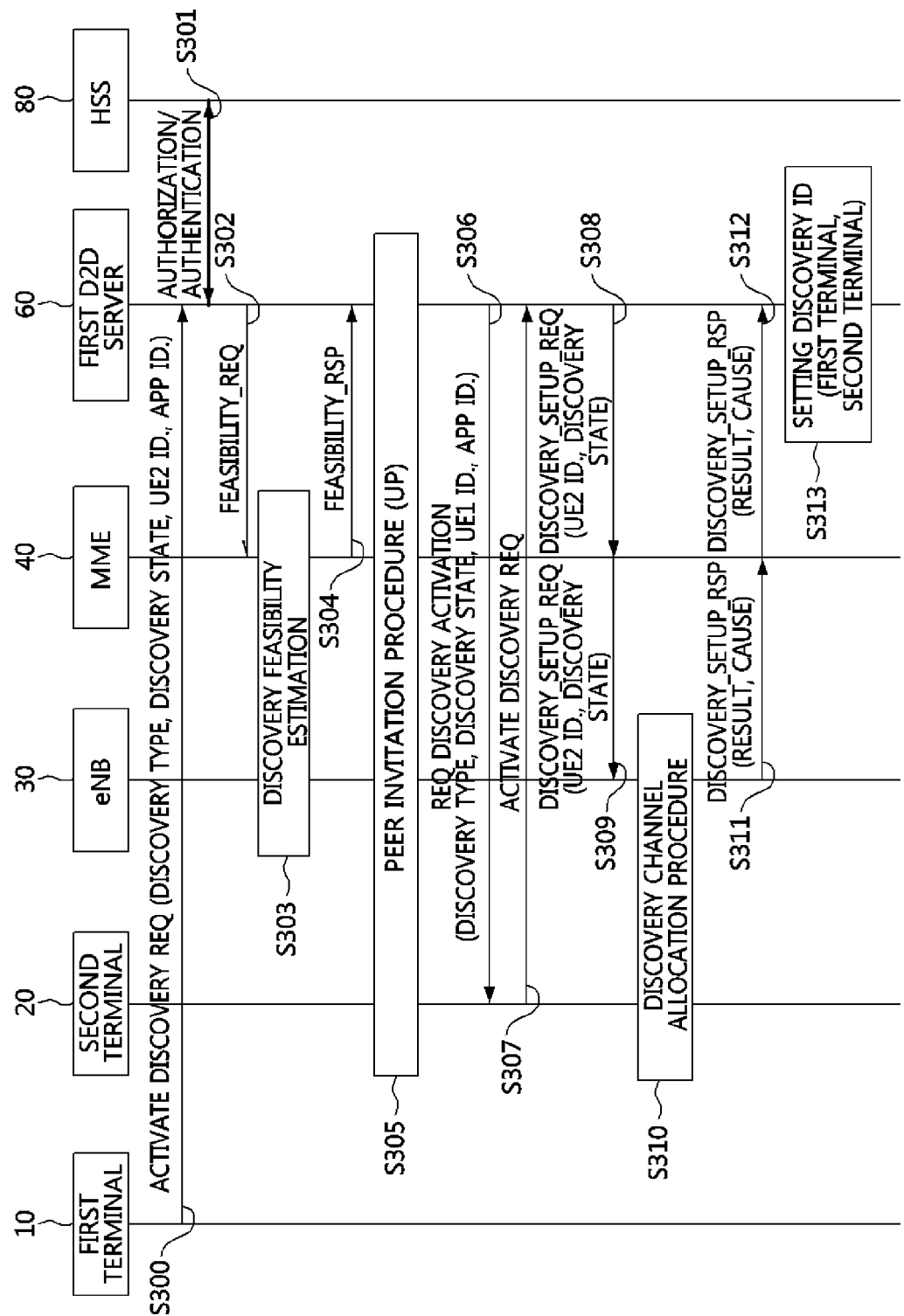
FIG. 20 is a sequence chart to show an activation procedure (S300~S313) of restricted discovery service using user plane.
Figure 21:
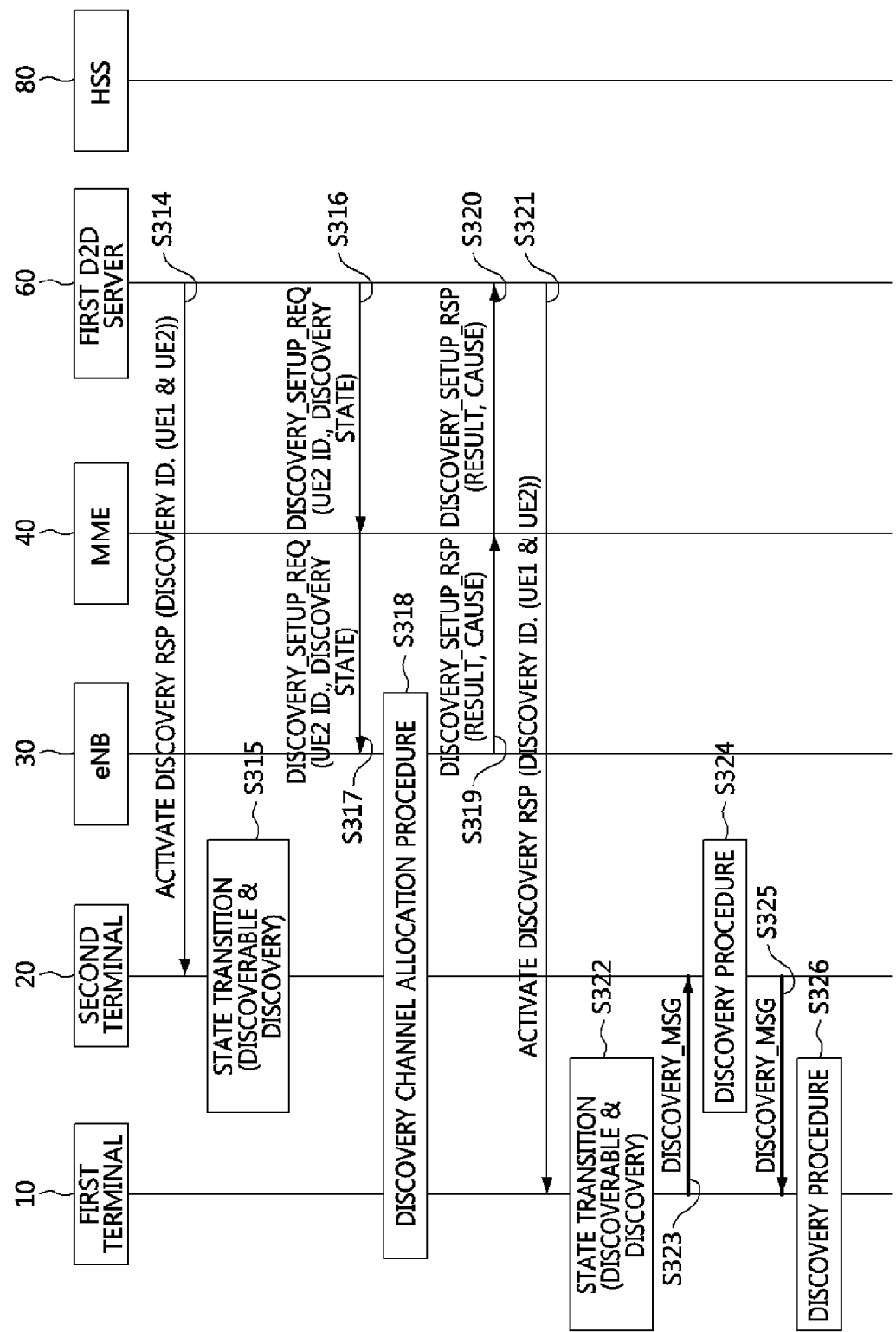
FIG. 21 is a sequence chart to show an activation procedure (S314~S326) of restricted discovery service using user plane.

FIG. 20 is a sequence chart to show an activation procedure (S300~S313) of restricted discovery service using user plane, and FIG. 21 is a sequence chart to show an activation procedure (S314~S326) of restricted discovery service using user plane.

Referring to FIG. 20 and FIG. 21, the activation procedure of restricted discovery service using user plane is the same with the activation procedure of restricted discovery service using control plane (refer to FIG. 16 and FIG. 17) except differences as follow.

Transferring discovery protocol messages between D2D servers

Using functional nodes included in user plane

Using discovery control message based on IP packet

Discovery feasibility estimation

A D2D server which received discovery request message requests to a MME, and the MME performs a procedure of estimating discovery feasibility having a format proposed by the restricted discovery using control plane, and responds to the D2D server.

Figure 22:
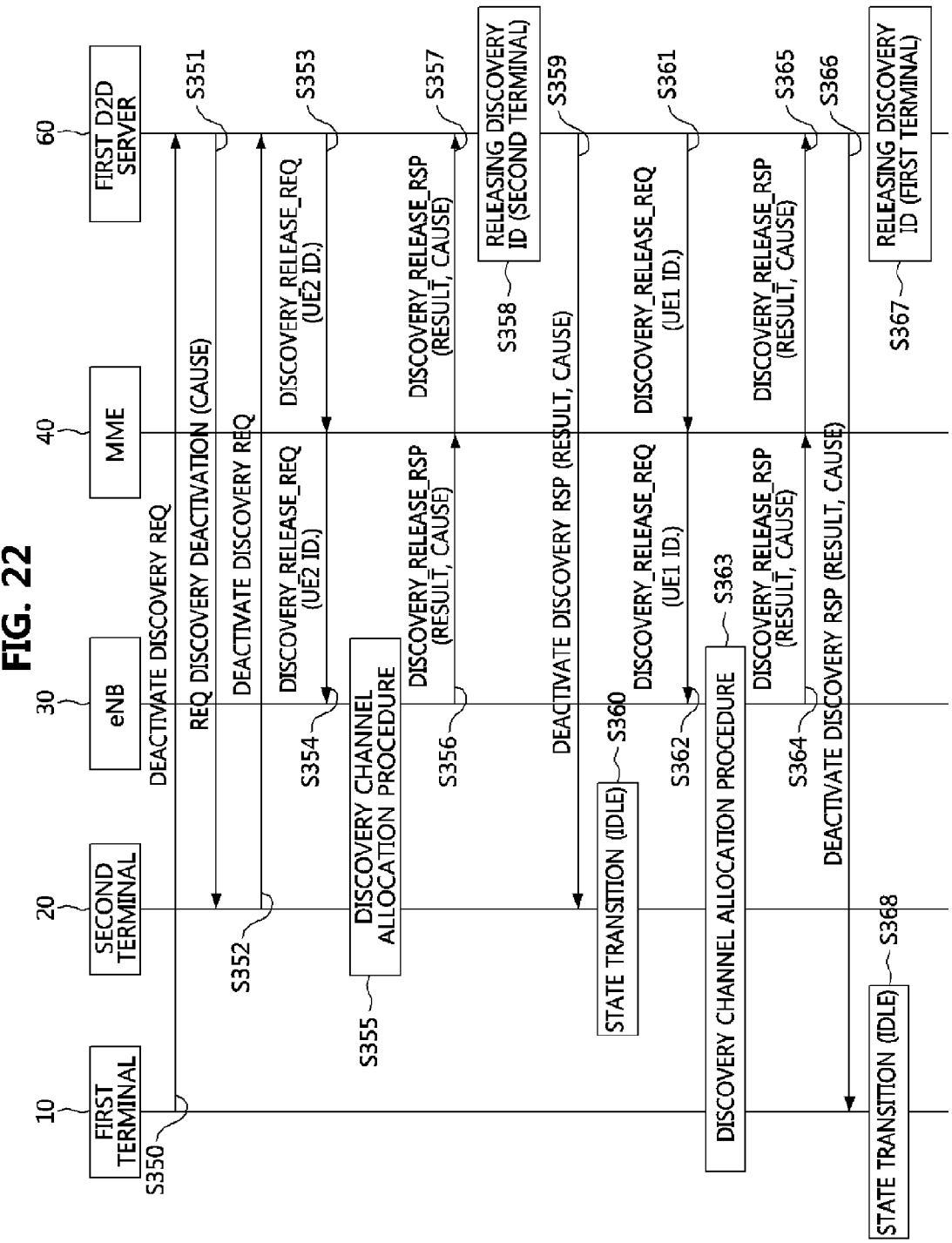
FIG. 22 is a sequence chart to show a deactivation procedure of restricted discovery service using user plane.

FIG. 22 is a sequence chart to show a deactivation procedure of restricted discovery service using user plane.

Referring to FIG. 22, the deactivation procedure of restricted discovery service using user plane is the same with the deactivation procedure of restricted discovery service using control plane (refer to FIG. 18 and FIG. 19) except differences as follow.

Transferring discovery protocol messages between D2D servers

Using functional nodes included in user plane

Using discovery control message based on IP packet

Blind Restricted Discovery Service

A blind discovery service means a service performing discovery on all the terminals which reciprocally approve of discovery without designating a specific terminal. A procedure of the blind discovery may be started at the time that an application requests the blind discovery, the blind discovery may be performed during a predetermined duration or until the application requests to cancel the discovery, according to a configuration of operation mode.

The procedure of activating the blind discovery service may be started when the application of the first terminal (that is, a discovery terminal) transmits a discovery request, that is, a discovery request of terminals which approve of reciprocal discovery with it, to a DMF. The DMF, which is requested the blind discovery service, may transmit a discovery activation request message including information on a discovery type, a discovery state, and so on, to a D2D server.

When the discovery activation request message is received from the first terminal, the D2D server may perform an authentication procedure on the first terminal which requested the blind discovery, then determine which terminals among target terminals are participated in the discovery. That is, since the D2D server has a list of IDs of terminals which approved of discovery with the first terminal stored, the D2D server can detect a terminal having a possibility to be adjacent to the first terminal based on the list of IDs. The D2D server may identify a serving cell of the corresponding terminal, when the terminal in the state of RRC_CONNECTED. Meanwhile, The D2D server may identify respective serving cell of terminals after transitioning the terminals located in the same tracking area among the corresponding terminals into the state of RRC_CONNECTED, when the terminal is in the state of RRC_IDLE. The D2D server may assign discovery ID to other terminals (the second terminal~a Nth terminal), which have possibilities to be adjacent to the first terminal, as well as the first terminal.

After the above-mentioned procedure is completed, the D2D server may perform a discovery transmission channel allocation procedure of the first terminal first. Then, the D2D server may perform a procedure of allocating discovery channels for the second terminal to the Nth terminal by cooperating with a eNB and a LTE function of the corresponding terminal, and a procedure of transferring information on the discovery channel for the first terminal. The D2D server may activate transmitting and receiving discovery message, after transferring discovery IDs of itself and the first terminal, and a terminal ID of the first terminal.

After the above-mentioned procedure is completed, the D2D server may transmit channel information of the second terminal to the Nth terminal to the LTE function of the first terminal or transmit discovery IDs and terminal IDs of itself and the second terminal to the Nth terminal to the DMF of the first terminal, and activate transmitting and receiving discovery message.

After the above-mentioned procedure is completed, the first terminal to the Nth terminal may be transitioned to the state of 'discoverable & discovery'. Thus, the first terminal may try to receive discovery message from the second terminal to the Nth terminal through discovery channels for the second terminal to the Nth terminal which are already known, may report to the application that the corresponding terminal is found when the discovery message is received successfully. In the same manner, the second terminal to the Nth terminal may try to receive discovery message from the first terminal through discovery channel for the first terminal which is already known, may report to the application that the corresponding terminal is found when the discovery message is received successfully.

A procedure of deactivating blind discovery service may be started by an application. That is, when a blind discovery cancel request is received from the application, the DMF may transmit a discovery deactivation request message to the D2D server, and the D2D server which received it may make the corresponding eNB and the corresponding terminal perform necessary procedures by requesting the corresponding eNB to release allocation of discovery channels for the first terminal to the Nth terminal, and stop receiving the discovery channels. The D2D server may request DMFs of the second terminal to the Nth terminal to deactivate discovery, receive the response to the discovery deactivation request from the DMFs of the second terminal to Nth terminals. Finally, the D2D server may transmit a response message in response to the discovery deactivation request to the DMF of the first terminal.

Restricted Discovery Event and Discovery Information Report

A procedure of reporting restricted discovery events and discovered information means a procedure of reporting events occurring during a D2D discovery procedure and information obtained through the D2D discovery procedure. A discovery event reporting is a procedure that terminals which transmitted discovery message and terminals which received discovery message report corresponding events to the D2D server, and a discovered information reporting is a procedure of reporting information on adjacent terminals to the D2D server.

These information may be used for charging of D2D discovery and managing proximities of terminals. The information, obtained by the procedure of reporting the restricted discovery event and the discovered information, may be used as pre-information for selecting a following communication mode (a direct communication or communication via a network entity).

In the procedure of reporting the restricted discovery event and the discovered information, a case that the discovery terminal and the discoverable terminal exist in the same operator network and a case that the discovery terminal and the discoverable terminal exist in difference operator networks, are considered. Especially, in the latter case that the discovery terminal and the discoverable terminal exist in difference operator networks, the above-described procedure may be performed by interworking between D2D servers.

Figure 23:
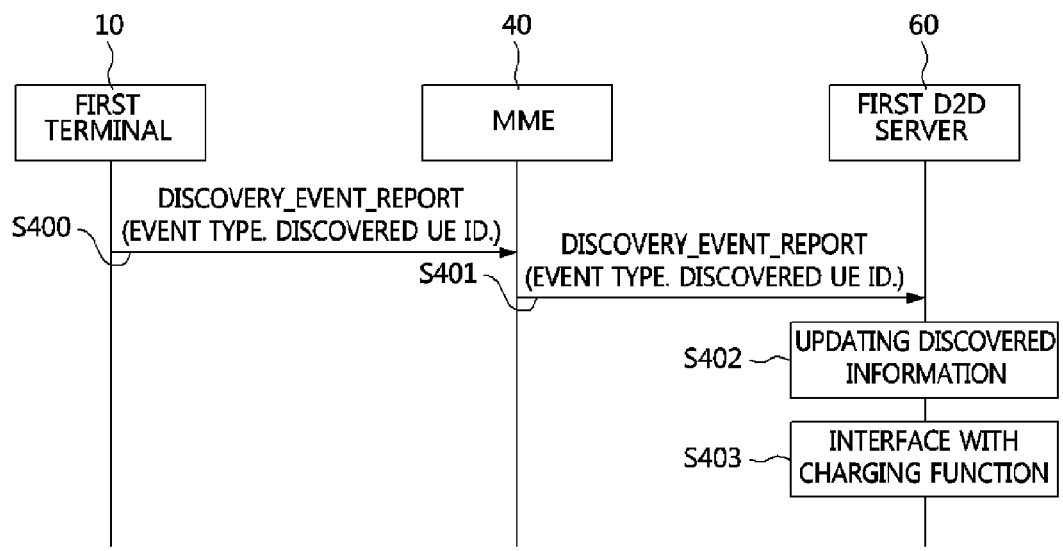
FIG. 23 is a sequence chart to show a procedure of reporting discovery event and discovered information using control plane.

FIG. 23 is a sequence chart to show a procedure of reporting discovery event and discovered information using control plane.

Referring to FIG. 23, the first terminal 10 may transmit a discovery event report message (DISCOVERY_EVENT_REPORT) to the MME 40 (S400). The MME 40 may transmit the received discovery event report message to the first D2D server 60 (S401). The discovery event report message may include information on an event type, an ID of the discoverable terminal, and so on.

The first D2D server 60 may update the discovered information based on the received discovery event report message (S402), may access a charging function in order to manage charging on the discovery (S403).

Figure 24:
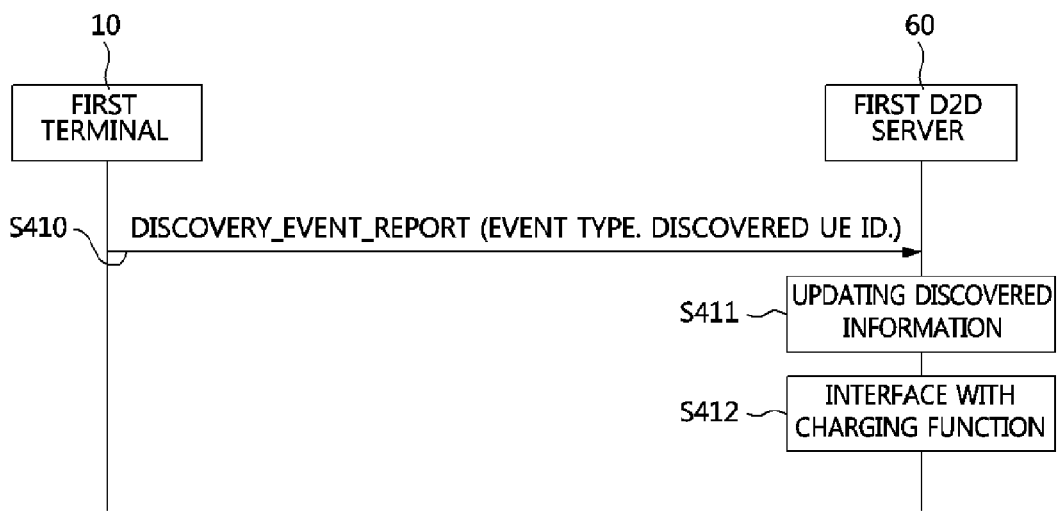
FIG. 24 is a sequence chart to show a procedure of reporting discovery event and discovered information using user plane.

FIG. 24 is a sequence chart to show a procedure of reporting discovery event and discovered information using user plane.

Referring to FIG. 24, the first terminal 10 may transmit a discovery event report message (DISCOVERY_EVENT_REPORT) to the first D2D server 60 (S410). The discovery event report message may include information on an event type, an ID of the discoverable terminal, and so on.

The first D2D server 60 may update the discovered information based on the received discovery event report message (S411), may access a charging function in order to manage charging on the discovery (S412).

Discovery Related Information Exchange Between D2D Servers

A procedure for D2D discovery configuration information exchange between D2D servers is a procedure to make discovery procedures between terminals managed by different D2D servers possible. Especially, through this procedure, the discovery procedure between terminals which subscribe to different operators may be made possible. This procedure may include a step of transmitting information of spectrum for the restricted discovery and radio resource allocation by managed by each D2D server of the respective operator, and a step of transmitting above-explained protocol messages for the restricted discovery transparently. For the restricted discovery, information exchanged by the D2D servers and the procedures performed by the D2D servers may be as follows.

Information on spectrum & radio resource configuration
  Transmitting spectrum related information for the restricted discovery and information on a configuration of discovery resources of a cell managed by the D2D server, to a counterpart D2D server
A procedure for authorizing application
  Exchanging capsulized protocol messages for the procedure of authorizing application, as explained in the 'Authentication of restricted discovery application', with a counterpart D2D server
Approving and cancelling approval of discovery
  Exchanging capsulized protocol messages for the procedure of obtaining the list of discoverable terminals, as explained in the 'Approving and canceling approval of restricted discovery', with a counterpart D2D server
A procedure of obtaining discovery IDs
  Exchanging capsulized protocol messages for obtaining a discovery ID of the discoverable terminal, as explained in the 'Restricted Discovery Service for a specific terminal', with a counterpart D2D server
A procedure of activating discovery
  Exchanging capsulized protocol messages for the procedure of activating the restricted discovery, as explained in the 'Restricted Discovery Service for a specific terminal' and the 'Blind restricted discovery service', with a counterpart D2D server.
A procedure of deactivating discovery
  Exchanging capsulized protocol messages for the procedure of deactivating the restricted discovery, as explained in the 'Restricted Discovery Service for a specific terminal' and the 'Blind restricted discovery service', with a counterpart D2D server.
A procedure of reporting discovery information
  Exchanging capsulized protocol messages for the procedure of reporting the restricted discovery, as explained in the 'Restricted discovery event and discovery information report', with a counterpart D2D server.

Figure 25:
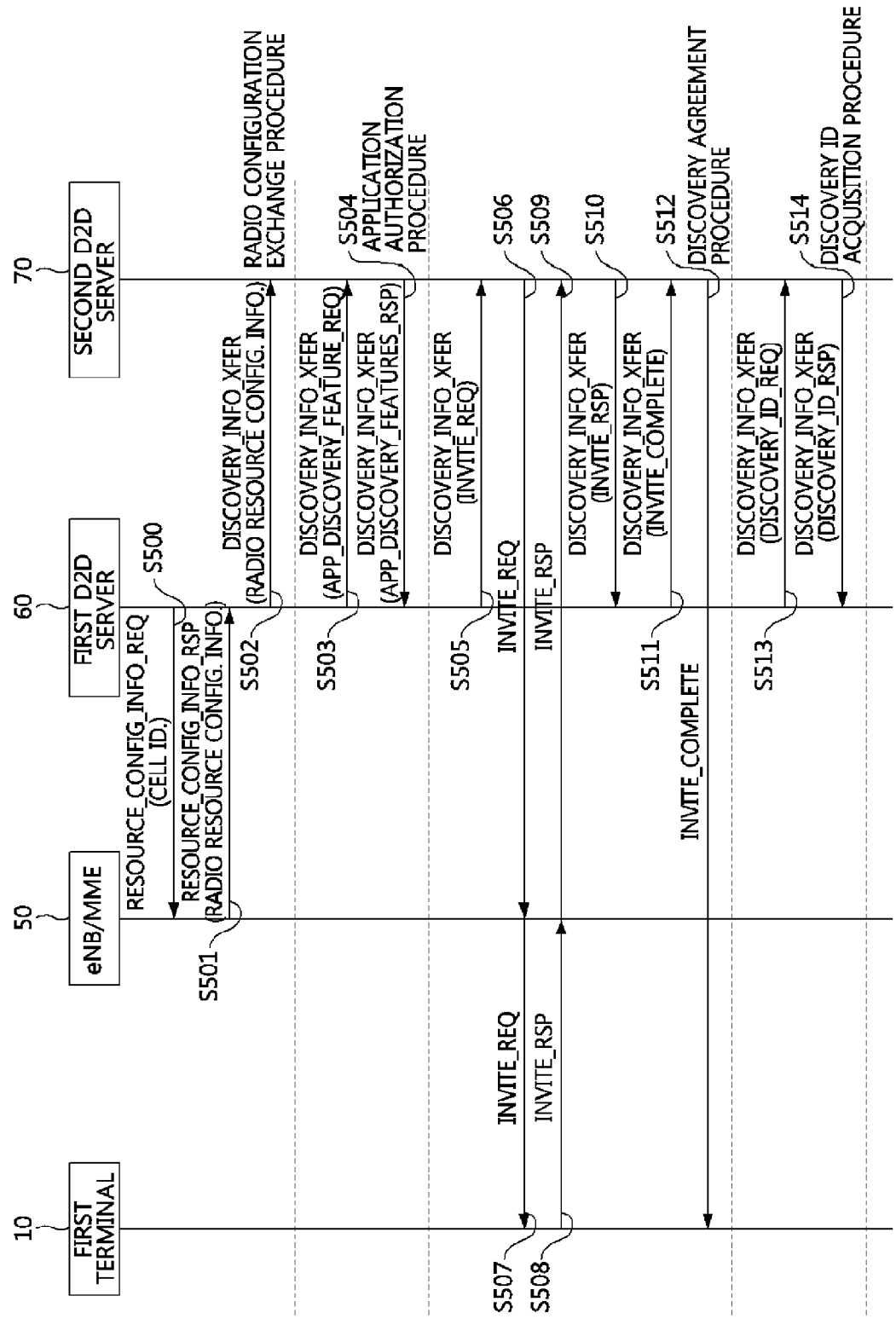
FIG. 25 is a sequence chart to show a procedure (S500~S514) of discovery configuration information exchange between D2D servers for restricted discovery using control plane function.
Figure 26:
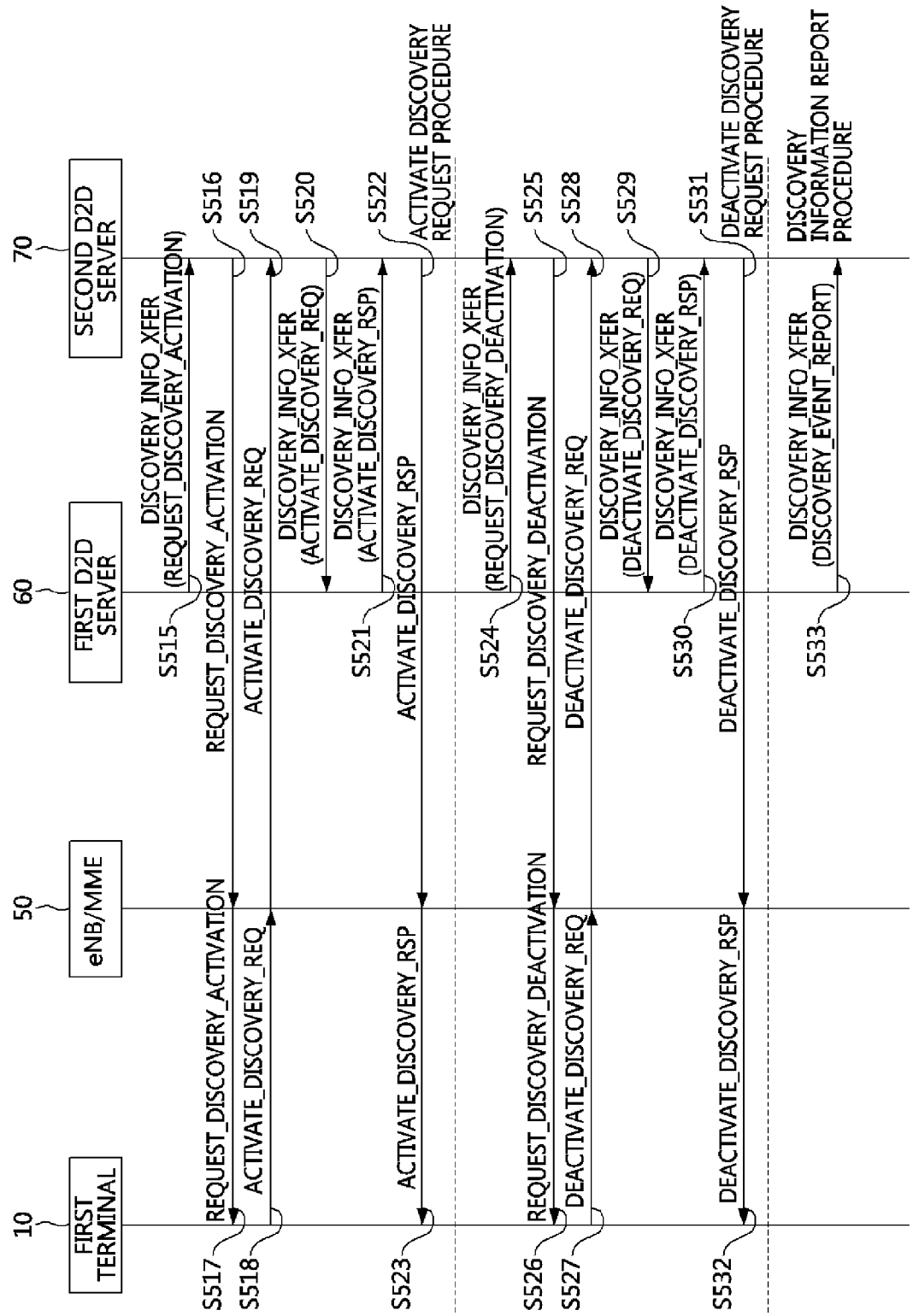
FIG. 26 is a sequence chart to show a procedure (S515~S533) of discovery configuration information exchange between D2D servers for restricted discovery using control plane function.

FIG. 25 is a sequence chart to show a procedure (S500~S514) of discovery configuration information exchange between D2D servers for restricted discovery using control plane function, and FIG. 26 is a sequence chart to show a procedure (S515~S533) of discovery configuration information exchange between D2D servers for restricted discovery using control plane function.

Referring to FIG. 25 and FIG. 26, in a procedure of exchanging radio configuration, the first D2D server 60 may transmit a resource configuration information request message (RESOURCE_CONFIG_INFO_REQ) to the eNB/MME 50 (S500). The eNB/MME 50 may transmit a resource configuration information response message (RESOURCE_CONFIG_INFO_RSP) in response to the resource configuration information request message to the first D2D server 60 (S501). The resource configuration information request message may include information on a Cell ID, etc. The resource configuration information response message may include information on radio resource configuration, etc. The first D2D server 60 may transmit a discovery information message (DISCOVERY_INFO_XFER) to the second D2D sever 70 (S502). The discovery information message may include information on radio resource configuration, etc.

In the procedure of authorizing application, the first D2D server 60 may transmit an application discovery feature request message (APP_DISCOVERY_FEATURE_REQ) to the second D2D server 70 (S503). The second D2D server 70 may transmit an application discovery feature response message (APP_DISCOVERY_FEATURE_RSP) in response to the application discovery feature request message to the first D2D server 60 (S504). The application discovery feature request message means a message requesting to authorizing that the application uses discovery, and may include information on an application ID, an ID of the terminal, and so on. The application discovery feature response message means a message in response to the request of authorizing usage of discovery by the application, and may include information on a result, a cause of the result, and so on.

In the procedure of approving of discovery, the first D2D server 60 may transmit an invite request message (INVITE_REQ) to the second D2D sever 70 (S505). The second D2D server 70 may transmit the invite request message received from the first D2D sever 10 to the eNB/MME 50 (S506), and the eNB/MME 50 may transmit the invite request message received from the second D2D server 70 to the first terminal 10 (S507). The first terminal 10 may transmit an invite response message (INVITE_RSP) in response to the invite request message to the eNB/MME 50 (S508), and the eNB/MME 50 may transmit the invite response message to the second D2D server 70 (S509).

Then, the second D2D server 70 may transmit an invite response message in response to the invite request message received from the first D2D sever 60 to the first D2D server 60 (S510). The first D2D server 60 may transmit an invite complete message (INVITE_COMPLETE) in response to the invite response message to the second D2D server 70 (S511). The second D2D server 70 may transmit the invite complete message to the first terminal 10 (S512).

Here, the invite request message means a request message used for updating the list of discoverable terminals, and may include information on an ID of a target terminal, an application ID, and so on. The invite response message means a response message used for updating the list of discoverable terminals, and may include information on a result, a cause of the result, and so on. The invite complete message means a complete message used for updating the list of discoverable terminals, and may include information on a discovery ID of a source terminal, etc.

In the procedure of obtaining discovery ID, the first D2D server 60 may transmit a discovery ID request message (DISCOVERY_ID_REQ) to the second D2D server 70 (S513), the second D2D server 70 may transmit a discovery ID response message in response to the discovery ID request message to the first D2D server 60 (S514).

Here, the discovery ID request message means a message requesting a discovery ID of a specific terminal, and may include information on an ID of the specific terminal, etc. The discovery ID response message means a response message to the discovery ID request message, and may include information on a result, a cause of the result, a discovery ID, and so on.

In the procedure of activating discovery, the first D2D server 60 may transmit a discovery activation request message (REQUEST_DISCOVERY_ACTIVATION) to the second D2D server 70 (S515). The second D2D server 70 may transmit the discovery activation request message received from the first D2D server 60 to the eNB/MME 50 (S516), and the eNB/MME 50 may transmit the discovery activation request message received from the second D2D server 70 to the first terminal 10 (S517). The first terminal 10 may transmit an activated-discovery request message (ACTIVATE_DISCOVERY_REQ) in response to the discovery activation request message to the eNB/MME 50 (S518), the eNB/MME 50 may transmit the activated-discovery request message received from the first terminal 10 to the second D2D server 70 (S519).

Then, the second D2D server 70 may transmit the activated-discovery request message to the first D2D server 60 (S520), and the first D2D server 60 may transmit a activated-discovery response message (ACTIVATE_DISCOVERY_RSP) in response to the activated-discovery request message to the second D2D server 70 (S521). When the activated-discovery response message is received from the first D2D server 60, the second D2D server 70 may transmit an activated-discovery response message to the eNB/MME 50 (S522). The eNB/MME 50 may transmit the activated-discovery response message received from the second D2D server 70 to the first terminal 10 (S523).

Here, the discovery activation request message (REQUEST_DISCOVERY_ACTIVATION) means a message requesting discovery activation started in a network, and may include information on a cause, a discovery type, a discovery state, a range class (for discoverable terminals), a receiving mode (for discovery terminals), etc. The activated-discovery request message (ACTIVATE_DISCOVERY_REQ) means a message requesting discovery activation, and may include information on a discovery type, a discovery state, a terminal ID of a target terminal, a permission flag, a receiving mode, a range class and so on. The activated-discovery response message means a response message to the D2D discovery activation request, and may include information on a result, a cause of the result, a target discovery ID, etc.

In the procedure of deactivating discovery, the first D2D server 60 may transmit a discovery deactivation request message (REQUEST_DISCOVERY_DEACTIVATION) to the second D2D server 70 (S524). The second D2D server 70 may transmit the discovery deactivation request message received from the first D2D server 60 to the eNB/MME 50 (S525), and the eNB/MME 50 may transmit the discovery deactivation request message received from the second D2D server 70 to the first terminal 10 (S526). The first terminal may transmit a deactivated-discovery request message (DEACTIVATE_DISCOVERY_REQ) in response to the discovery deactivation request message to the eNB/MME 50 (S527), the eNB/MME 50 may transmit the deactivated-discovery request message received from the first terminal 10 to the second D2D server 70 (S528).

Then, the second D2D server 70 may transmit the deactivated-discovery request message to the first D2D server 60 (S529), and the first D2D server 60 may transmit a deactivated-discovery response message (DEACTIVATE_DISCOVERY_RSP) in response to the deactivated-discovery request message to the second D2D server 70 (S530). When the deactivated-discovery response message is received from the first D2D server 60, the second D2D server 70 may transmit a deactivated-discovery response message to the eNB/MME 50 (S531). The eNB/MME 50 may transmit the deactivated-discovery response message received from the second D2D server 70 to the first terminal 10 (S532).

Here, the discovery deactivation request message (REQUEST_DISCOVERY_DEACTIVATION) means a message requesting discovery deactivation started in a network, and may include information on a cause, etc. The deactivated-discovery request message (DEACTIVATE_DISCOVERY_REQ) means a message requesting discovery deactivation. The deactivated-discovery response message means a response message to the D2D discovery deactivation request, and may include information on a result, a cause of the result, etc.

In the procedure of reporting discovery information, the first D2D server 60 may transmit a discovery event report message (DISCOVERY_EVENT_REPORT) to the second D2D server 70 (S533). Here, the discovery event report message means a message reporting D2D discovery related events and information, and may include information on an event type, an ID of the discovered terminal, etc.

Figure 27:
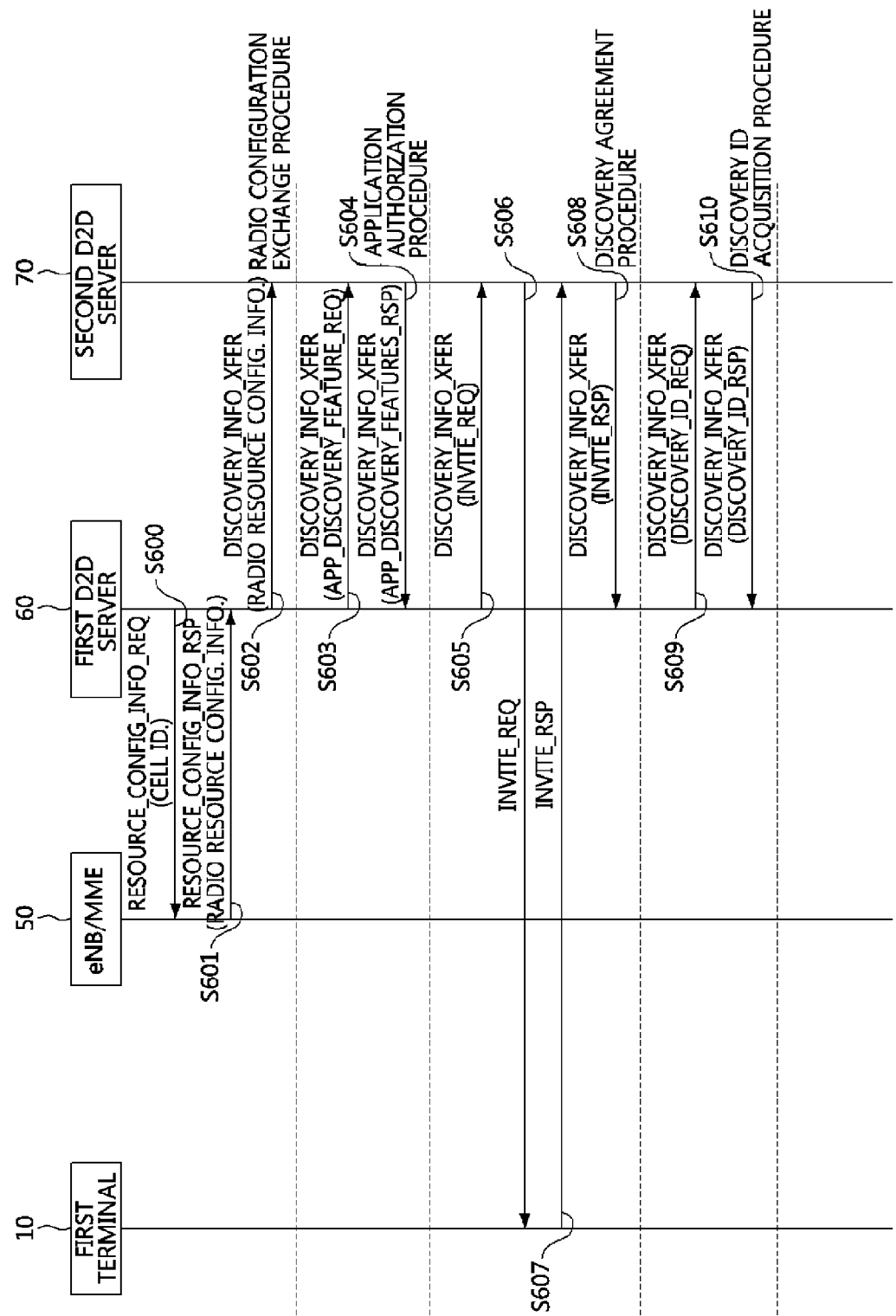
FIG. 27 is a sequence chart to show a procedure (S600~S610) of exchanging discovery configuration information between D2D servers for restricted discovery using user plane function.
Figure 28:
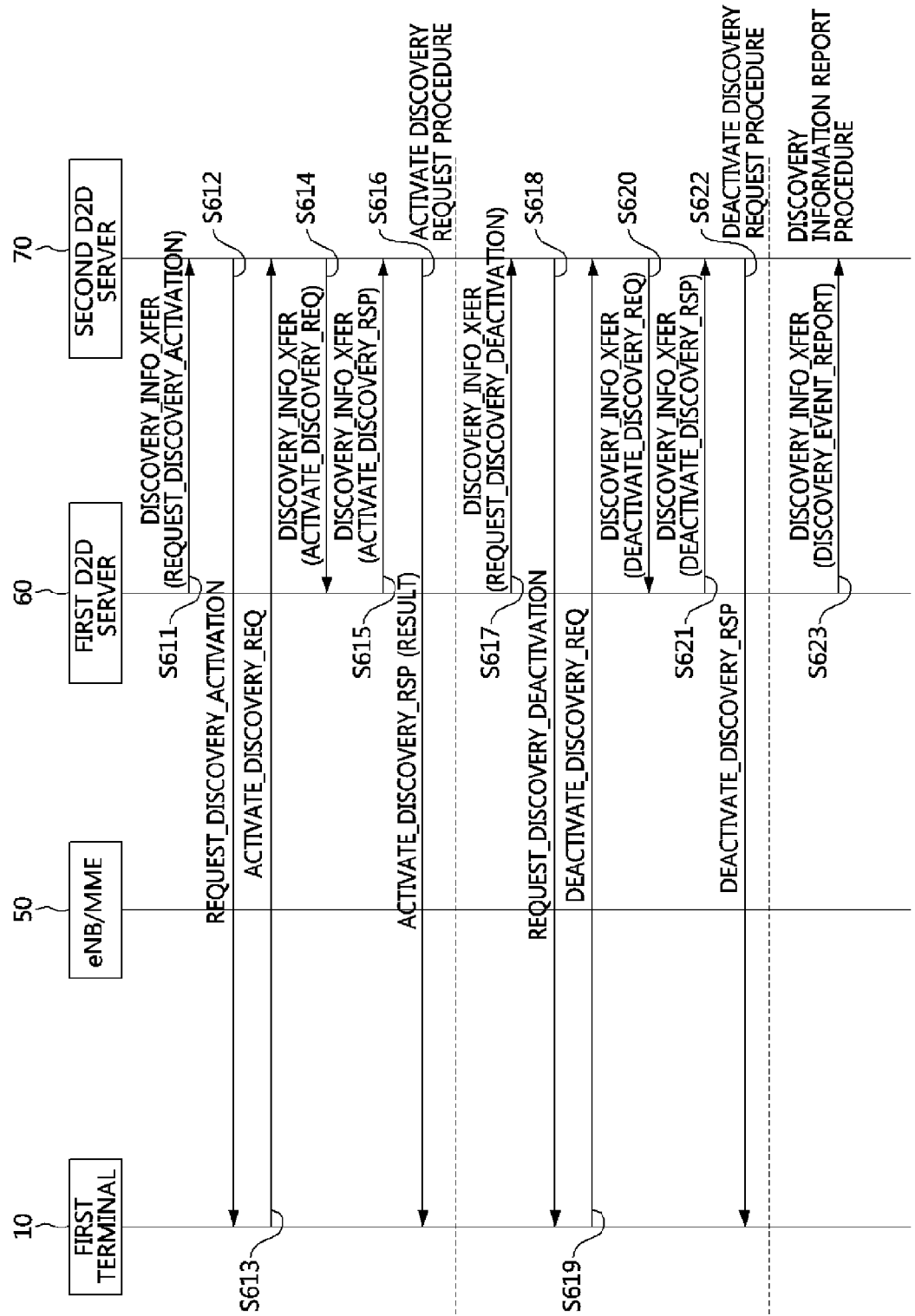
FIG. 28 is a sequence chart to show a procedure (S611~S623) of exchanging discovery configuration information between D2D servers for restricted discovery using user plane function.

FIG. 27 is a sequence chart to show a procedure (S600~S610) of exchanging discovery configuration information between D2D servers for restricted discovery using user plane function, and FIG. 28 is a sequence chart to show a procedure (S611~S623) of exchanging discovery configuration information between D2D servers for restricted discovery using user plane function.

Referring to FIG. 27 and FIG. 28, a radio configuration exchange procedure, an application approval procedure, a discovery ID acquisition procedure, and a discovery information reporting procedure may be the same with those depicted in above FIG. 25 and FIG. 26.

A discovery approval procedure, an activated discovery request procedure, and a deactivated discovery request procedure may be the same with those depicted in above FIG. 25 and FIG. 26, except that the messages exchanged between the first terminal 10 and the second D2D server 70 are not exchanged through the eNB/MME 50.

Configuration of D2D Discovery Information

D2D discovery information for restricted D2D discovery means information transmitted during the restricted D2D discovery procedure. The D2D discovery information for the restricted D2D discovery may include a discovery ID identifying a specific terminal (that is, UE). These information are required not to occur any security problems even when it is disclosed. Also, a terminal may identify a specific terminal in its operator network or other operator network, by using mapping information which defines relation of the received discovery ID and a terminal ID of the specific terminal, and may access the specific terminal by using the identified terminal ID.

The D2D discovery information may be allocated by the DMF located on network, and may be obtained through opening of the terminal as above mentioned.

The D2D discovery message for the restricted D2D discovery may include an identifier, a discovery ID, and an application ID. The identifier may be used for identifying type of the D2D discovery information. The discover ID may be used for recognizing a terminal which transmitted the D2D discovery information, and the discovery ID and the terminal ID may have an one-to-one relationship. The application ID may be used for transmitting an application ID requested for the discovery service. If a length on the discovery message for the restricted discovery is different from a length on the discovery message for open discovery, a reserved field included in the restricted discovery message is not used.

The identifier included in the D2D discovery message for the restricted discovery may have a length of 2 bits and may be defined as follows.

00
restricted D2D discovery information
01
open D2D discovery information
10
public safety information
11
reserved The discovery ID included in the restricted D2D discovery message may be used for obtaining a corresponding terminal ID. When the discovery message is received, the terminal may identify and obtain the terminal ID by comparing the discovery ID included in the received discovery message and the list of discoverable terminals which it stores.

Figure 29:
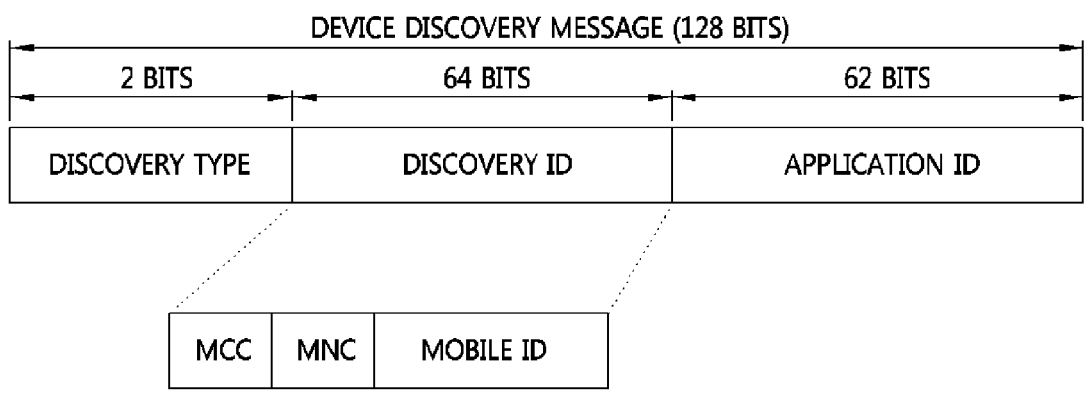
FIG. 29 is a conceptual diagram to depict an example embodiment of format on discovery message (globally unique discovery ID) for restricted discovery.

The discovery ID may be defined as a globally unique ID or a regionally unique ID. Each of cases has following features.

globally unique ID
    A change of the discovery ID is not needed even when the terminal moves to another region
regionally unique ID
    A change of the discovery ID is needed when discoverable terminal moves to another region out of predefined region
    A change of the discovery ID is needed whenever a discovery ID of a terminal included in the discoverable terminal lists is changed FIG. 29 is a conceptual diagram to depict an example embodiment of format on discovery message (globally unique discovery ID) for restricted discovery.

Referring to FIG. 29, the device discovery message may have a total length of 16 bytes and may include a discovery type information, a discovery ID, and an application ID. The discovery type information may have a length of 2 bits. The discovery ID may have a length of 64 bits, and may be configured to hierarchical format, which is similar to IMSI (international mobile subscriber identity) format used in existing LTE, including MMC (mobile country code), MNC (mobile network code), and mobile ID. The application ID may have a length of 62 bits.

Figure 30:
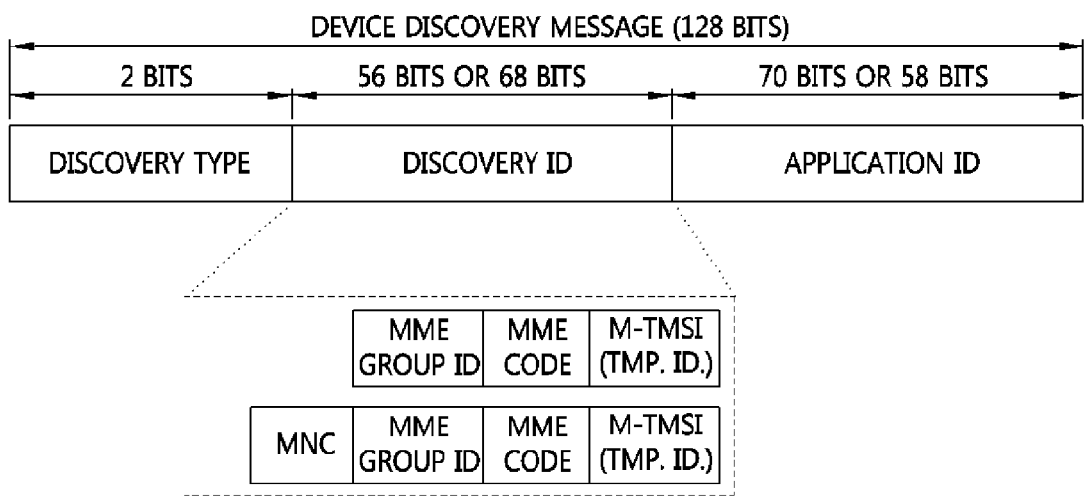
FIG. 30 is a conceptual diagram to depict another embodiment of format on discovery message (regionally unique discovery ID) for restricted discovery.

FIG. 30 is a conceptual diagram to depict another embodiment of format on discovery message (regionally unique discovery ID) for restricted discovery.

Referring to FIG. 30, the device discovery message may have a total length of 16 bytes and may include a discovery type information, a discovery ID, and an application ID. The discovery type information may have a length of 2 bits. The discovery ID may have a length of 56 bits or 68 bit, and may be similar to GUTI (globally unique temporary UE identity) format used in existing LTE. That is, the discovery ID may be configured to a hierarchical format including MCC, MNC, MME group ID, MME code, and M-TMSI (MME temporary mobile subscriber identity) (or temporary ID) or a hierarchical format including MME group ID, MME code, and M-TMSI (or temporary ID). The application ID may have a length of 70 bits or 58 bits.

FIG. 31 is a conceptual diagram to depict definitions of protocol messages for D2D discovery, and FIG. 32 is a conceptual diagram to depict definitions of other protocol messages for D2D discovery.

Referring to FIG. 31 and FIG. 32, the depicted protocol messages are the protocol messages shown in FIG. 12 to FIG. 28.

FIG. 33 is a conceptual diagram to depict parameter definitions of protocol messages for D2D discovery.

Referring to FIG. 33, the definitions of parameters for the protocol messages may be clarified.

While the example embodiments of the present invention and their advantages have been described in detail, it should be understood that various changes, substitutions and alterations may be made herein without departing from the scope of the invention.

What is claimed is:

1. A method of performing device-to-device (D2D) communication in a discovery terminal, the method comprising:
   receiving a discovery identifier of the discovery terminal from a D2D server;
   performing an authentication procedure for restricted discovery of an application located in the discovery terminal with the D2D server, wherein the authentication procedure determines whether the application is authenticated for use of a feature of restricted discovery;
   performing an authorization for a restricted discovery operation of the application located in the discovery terminal with the D2D server; and
   obtaining terminal information of a discoverable terminal from the D2D server when the authorization is completed,
   wherein the discoverable terminal performs the restricted discovery operation with the discovery terminal,
   wherein the discovery identifier is mapped to a terminal identifier of the discovery terminal, and
   wherein the discovery identifier is used for identifying the discovery terminal in the D2D communication.

2. The method of claim 1, wherein the discovery identifier indicates the discovery terminal supports the restricted discovery operation.

3. The method of claim 1, wherein the performing an the authorization includes:
   transmitting an authorization request message to the D2D server, wherein the authorization request messages comprises requesting the authorization for the restricted discovery operation of the application located in the discovery terminal; and
   receiving an authorization response message in response to the authorization request message from the D2D server.

4. The method of claim 3, wherein the authorization request message includes the terminal identifier of the discovery terminal and an identifier of the application.

5. The method of claim 1, wherein the obtaining of the terminal information includes:
   transmitting a discoverable terminal information request message to the D2D server;
   receiving a discoverable terminal information response message in response to the discoverable terminal information request message from the D2D server; and
   updating a list of discoverable terminals based on the terminal information included in the received discoverable terminal information response message.

6. The method of claim 5, wherein the discoverable terminal information request message includes a terminal identifier of a target terminal, an operation flag, and an identifier of the application.

7. The method of claim 6, wherein the operation flag indicates a request for approving of the restricted discovery operation or a request for cancelling approval of the restricted discovery operation.

8. The method of claim 5, wherein the discoverable terminal information response message includes a terminal identifier of the discoverable terminal, and response information on whether to approve the restricted discovery operation.

9. The method of claim 8, wherein the terminal identifier of the discoverable terminal is added to the list of discoverable terminals based on approval of the restricted discovery operation in the response information.

10. A method of performing a device-to-device (D2D) communication in a discovery terminal, the method comprising:
    transmitting a restricted discovery activation request message to request activation of a restricted discovery operation of a discoverable terminal to a D2D server;
    performing an authentication procedure for restricted discovery of an application located in the discovery terminal with the D2D server, wherein the authentication procedure determines whether the application is authenticated for use of a feature of restricted discovery;
    receiving radio resource information for the restricted discovery operation via a base station interworking with the D2D server, when the restricted discovery operation of the discoverable terminal is activated;
    receiving a restricted discovery activation response message in response to the restricted discovery activation request message from the D2D server; and
    performing the restricted discovery operation with the discoverable terminal using radio resources indicated by the radio resource information.

11. The method of claim 10, wherein the restricted discovery activation request message includes a discovery type, a discovery state, an identifier of an application in the discovery terminal, and a terminal identifier of the discoverable terminal.

12. The method of claim 10, wherein the restricted discovery activation response message includes a discovery identifier of the discovery terminal and a discovery identifier of the discoverable terminal.

13. The method of claim 10, wherein the discovery terminal transitions to a restricted discovery activated state based on receiving the restricted discovery activation response message.

14. The method of claim 10, wherein the D2D server allocates radio resources to be used for the restricted discovery operation to the discoverable terminal based on receiving the restricted discovery activation request message.

15. The method of claim 14, wherein the D2D server configures a discovery identifier of the discovery terminal and a discovery identifier of the discoverable terminal based on completing the allocation of the radio resources.

16. The method of claim 10, wherein a message between the discovery terminal and the D2D server is exchanged through a mobile management entity (MME).

17. A method of performing a device-to-device (D2D) communication in a discovery terminal, the method comprising:

transmitting a restricted discovery deactivation request message to request deactivation of a restricted discovery operation of a discoverable terminal to a D2D server;

receiving information on releasing radio resources allocated for the restricted discovery operation via a base station interworking with the D2D server, when the restricted discovery operation of the discoverable terminal is deactivated;

receiving a restricted discovery deactivation response message in response to the restricted discovery deactivation request message from the D2D server; and transitioning to an idle state.

18. The method of claim 17, wherein the D2D server releases the radio resources allocated to the discoverable terminal for the restricted discovery operation-based on receiving the restricted deactivation request message.

19. The method of claim 18, wherein the D2D server releases a discovery identifier configured for the discoverable terminal based on completing the release of the radio resources allocated to the discoverable terminal.

20. The method of claim 17, wherein the D2D server releases a discovery identifier configured for the discovery terminal based on completing the release of the radio resources allocated to the discovery terminal.

* * * * *